United States Patent  
Van De Woestyne

(10) Patent No.: US 12,070,762 B2
(45) Date of Patent: Aug. 27, 2024

(54) TARGETED SPRAY APPLICATION TO PROTECT CROP

(71) Applicant: Deere & Company, Moline, IL (US)

(72) Inventor: Bradley W. Van De Woestyne, West Des Moines, IA (US)

(73) Assignee: Deere & Company, Moline, IL (US)

( * ) Notice: Subject to any disclaimer, the term of this patent is extended or adjusted under 35 U.S.C. 154(b) by 291 days.

(21) Appl. No.: 16/835,505

(22) Filed: Mar. 31, 2020

(65) Prior Publication Data

US 2021/0299692 A1 Sep. 30, 2021

(51) Int. Cl.
- B05B 12/12 (2006.01)
- A01C 15/04 (2006.01)
- A01M 7/00 (2006.01)
- B05B 12/08 (2006.01)

(52) U.S. Cl.
CPC .............. *B05B 12/12* (2013.01); *A01C 15/04* (2013.01); *A01M 7/0042* (2013.01); *A01M 7/0089* (2013.01); *B05B 12/082* (2013.01)

(58) Field of Classification Search
CPC .......... B05B 12/12–124; B05B 12/082; A01M 7/0089; A01M 7/0042; A01C 15/04
See application file for complete search history.

(56) References Cited

U.S. PATENT DOCUMENTS

| | | | |
|---|---|---|---|
| 6,141,904 A | 11/2000 | Greaves et al. | |
| 9,526,243 B2 | 12/2016 | Annigeri et al. | |
| 9,658,201 B2 | 5/2017 | Redden et al. | |
| 2002/0024665 A1* | 2/2002 | Masten | G01N 21/31 356/328 |
| 2015/0027044 A1* | 1/2015 | Redden | A01M 21/046 47/58.1 R |
| 2017/0223947 A1 | 8/2017 | Gall et al. | |
| 2018/0014452 A1 | 1/2018 | Starr | |
| 2018/0243773 A1* | 8/2018 | Davis | A01C 21/005 |
| 2019/0150357 A1* | 5/2019 | Wu | H04N 7/188 |
| 2020/0113166 A1* | 4/2020 | Warren, Jr. | G05D 1/101 |

FOREIGN PATENT DOCUMENTS

| | | |
|---|---|---|
| CN | 109068572 A | 12/2018 |
| WO | WO2015006675 A2 | 1/2015 |
| WO | WO2015154027 A1 | 10/2015 |

OTHER PUBLICATIONS

Extended European Search Report and Written Opinion issued in European Patent Application No. 21160523.3, dated Jul. 27, 2021, in 07 pages.

* cited by examiner

*Primary Examiner* — Tuongminh N Pham  
(74) *Attorney, Agent, or Firm* — Joseph R. Kelly; Kelly, Holt & Christenson, PLLC.

(57) ABSTRACT

An agricultural sprayer includes a spraying system that sprays a substance on an agricultural surface and a crop characteristic sensor that senses a crop characteristic of a crop on the agricultural surface and generates a crop characteristic signal indicative of the crop characteristic. The agricultural sprayer further includes a sprayer control system that identifies a position of a component of a crop plant based on the crop characteristic sensor signal and an action signal generator that generates an action signal based on the identified position of the component of the crop plant.

19 Claims, 14 Drawing Sheets

TARGETED SPRAY APPLICATION TO PROTECT CROP

FIELD OF THE DESCRIPTION

The present description generally relates to agricultural machines. More specifically, but not by limitation, the present description relates to a control system for an agricultural sprayer that controls operation of the sprayer based on identified characteristics of the crop to which the spray is to be applied.

BACKGROUND

There are many different types of agricultural machines. One such machine is an agricultural sprayer that has an agricultural spraying system. An agricultural spraying system often includes a tank or reservoir that holds a substance to be sprayed (e.g., pesticides, herbicides, fertilizer, etc.) on an agricultural surface, such as a field or crop. Such systems can include a fluid line or conduit mounted on a foldable, hinged, or retractable and extendible boom. The fluid line is coupled to one or more spray nozzles mounted along the boom. Each spray nozzle is configured to receive the fluid and direct the fluid to a crop or field during application. When the sprayer travels through the field, the boom is placed in a deployed position and the substance is pumped from the tank or reservoir, through the nozzles, so that it is sprayed or applied to the field over which the sprayer is traveling.

The discussion above is merely provided for general background information and is not intended to be used as an aid in determining the scope of the claimed subject matter.

SUMMARY

An agricultural sprayer includes a spraying system that sprays a substance on an agricultural surface and a crop characteristic sensor that senses a crop characteristic of a crop on the agricultural surface and generates a crop characteristic signal indicative of the crop characteristic. The agricultural sprayer further includes a sprayer control system that identifies a position of a component of a crop plant based on the crop characteristic sensor signal and an action signal generator that generates an action signal based on the identified position of the component of the crop plant.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
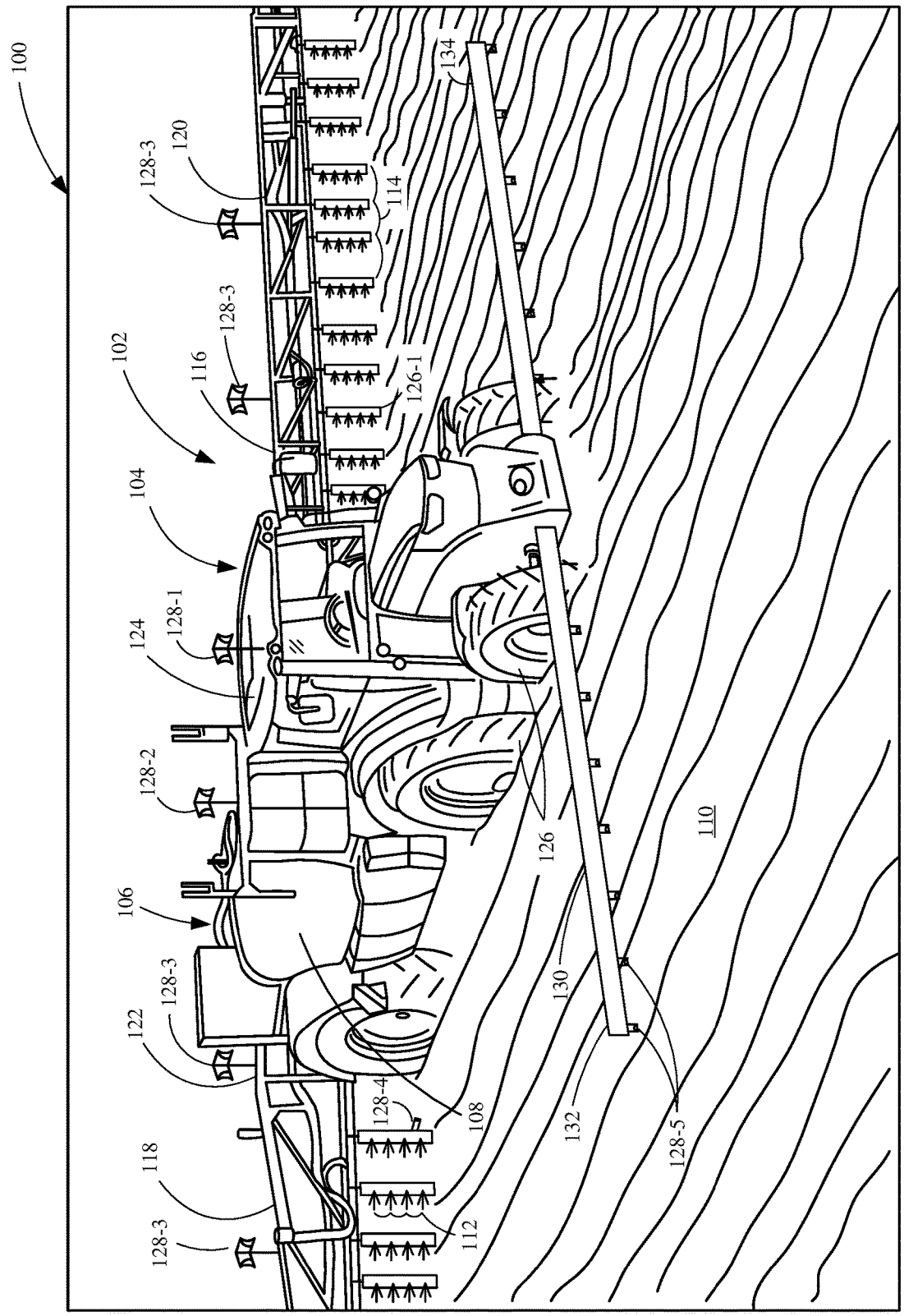
FIG. 1 is a pictorial illustration of one example of an agricultural sprayer.

The agricultural industry utilizes different types of sprayers/spray systems to apply a variety of substances to agricultural surfaces. One such substance is pesticide, which is used to eliminate and/or reduce crop damage due to a variety of pests. In current systems, an aerial vehicle (e.g., an airplane) or a ground vehicle (e.g., a mobile sprayer) is used to travel over the agricultural surface (e.g., crop field) and apply a blanket coverage of pesticide to the crops. These approaches tend to be inaccurate and costly. For example, the blanket application of pesticide can miss the portions of plants that would actually benefit from pesticide and thus pests are not prevented from damaging the crop. Furthermore, in an attempt to cover as much of the crop as possible, much of the pesticide being sprayed goes to waste. Thus, these typical approaches can lead to increased costs and reduced yields.

In the case of corn, for example, the precise placement of certain types of pesticide can be important. Corn plants have both male and female organs. The male organ is located at the top of the plant and includes a tassel. The female organ is located near the middle of the plant and includes ovules and silks. Generally, during reproduction, pollen from the tassel is released and falls towards the silks. Successful pollination occurs when at least one pollen grain lands on a silk. The pollen grain grows a tube through the length of the silk to the ovule, injects genetic material into the ovule and thus produces a zygote.

This process can be disrupted by a variety of factors, including, but not limited to, abiotic factors (e.g., water stress, excessive heat, etc.) and biotic factors (e.g., insects, disease, etc.). A variety of insect species (e.g., Japanese beetle, corn rootworm, beetle, etc.) feed on the silks of corn and can thus reduce the number of ovules fertilized by pollen. Sensing the presence of pests can be used in determining the type and quantity of pesticide/insecticide for a spraying operation to be effective. Typically, silks are only present for about a week. Therefore, accurately spraying the correct pesticide/insecticide in the correct location is helpful.

Another difficulty, in the case of corn, comes with the actual position of the silks on the corn plant. For instance, using the vegetative stage growth model, typical characteristics of the corn plant can be determined. At vegetative emergence (VE) the first leaf (coleoptile leaf) is visible. Then, typically, throughout the remaining vegetative stages (e.g., V1-V23) more leaves on the plant become visible, with each "V number" generally representing the number of visible leaves. Similarly, using the reproductive stage model (e.g., R1 (silking)-R6 (maturity)), various corn plant developments are known. For instance, at the silking stage (R1) the corn silks begin to emerge on the plant. This is typically the most critical stage in terms of crop yield as the fertilization (and thus eventual ear development) occurs. While for many corn plants the silks emerge at certain locations (e.g., between the twelfth and thirteenth leaves (V12 & V13)), the actual location can vary greatly depending on a number of conditions. For example, silk location can vary based on growing conditions (e.g., weather), the cultivar or hybrid of corn, etc. For purpose of illustration, but not by limitation, specific cultivars or hybrids of corn can have specific/unique traits that can be relevant to the application of sprayed substance. For instance, specific cultivars or hybrids of corn can attract varying types of pests, and/or their respective components (e.g. silks, leaves, etc.) can be typically located at different locations, amongst various other characteristics, respectively.

Spraying pesticides onto a corn crop with current systems (e.g., aerial or ground based spray systems that spray pesticide on the top of the corn canopy) will often result in the pesticide not being applied to the silks, or, it may result in an incorrect quantity and/or type of pesticide being used. Therefore, not only can the pesticide go to waste, but the resulting crop yield can be reduced because the pests are not prevented from destroying the plant (e.g., feeding on the silks and/or ovules). The present description thus proceeds with respect to a sprayer that senses the location of the silks and controllably applies pesticide to that location. The sprayer can be self-propelled or towed.

FIG. 1 illustrates an agricultural environment 100 in which one example of an agricultural sprayer system 102 is shown. Sprayer system 102 is shown with a towing vehicle 104 towing a towed implement 106 having a tank 108 containing a substance that is to be applied to agricultural surface 110. Tank 108 is fluidically coupled to spray nozzles 112 by a delivery system comprising a set of conduits. A fluid pump is configured to pump the liquid from tank 108 through the conduits and through spray nozzles 112. Spray nozzles 112 are coupled to vertical spray arms 114 which are coupled to and spaced apart along boom 116. Boom 116 includes boom arms 118 and 120 which can articulate or pivot relative to a center frame 122. Thus, boom arms 118 and 120 are movable between a storage or transport position and an extended or deployed position (shown in FIG. 1).

In the example shown in FIG. 1, vehicle 104 is a tractor having an operator compartment or cab 124. Vehicle 104 also includes a set of traction elements as well, such as wheels 126. The traction elements can also be tracks, or other traction elements. It is noted that in other examples, sprayer system 102 is self-propelled. That is, rather than being towed by a towing vehicle 104, the machine that carries the spraying system also includes propulsion and steering systems.

Sprayer system 102 further includes a number of sensors 128 (identified as 128-1 to 128-5) coupled to and placed at various locations on components of sprayer system 102. Sensors 128 can be located on towing vehicle 104, implement 106, including boom 116 and vertical spray arms 114, as well as various other locations within sprayer system 102. In the example illustrated in FIG. 1, agricultural sprayer system 102 also includes a sensor boom 130, having sensor boom arms 132 and 134, coupled to towing machine 104. Sensor boom 130 includes a number of sensors 128-5 coupled to and spaced apart along arms 132 and 134 so that they travel between the crop rows.

As will be discussed in more detail herein, sensors 128 are, in one example, configured to sense various characteristics of an agricultural environment, including, but not limited to, the location and position of the corn silks on the corn plants. Sensors 128 generate sensor signals indicative of the identified corn silk position. Those sensor signals can be received by a control system configured to generate control signals to adjust the application of the substance to be sprayed as well as other various operating parameters of sprayer system 102. Thus, a pesticide, for example, can be accurately sprayed on the corn silks.

FIG. 1 shows that the sensors can be mounted at one or more locations in the sprayer system 102. For example, they can be forward-looking sensors 128-1 mounted on towing vehicle 104. They can be side-looking sensors 128-2 mounted to implement 106 and aimed to look to the sides of implement 106, forward of nozzles 112. They can be forward-looking sensors 128-3 mounted on locations spaced along boom 116 and aimed to look forward of boom 116. They can be sensors 128-4 that are mounted to travel beneath the crop canopy. They can be sensors 128-5 that are mounted to travel ahead of implement 106 and below the crop canopy on sensor boom 130. It is noted that these are only some examples of the locations of sensors 128, and that sensors 128 can be mounted to one or more of these locations or various other locations within sprayer system 102 and/or any combinations thereof.

Figure 2:
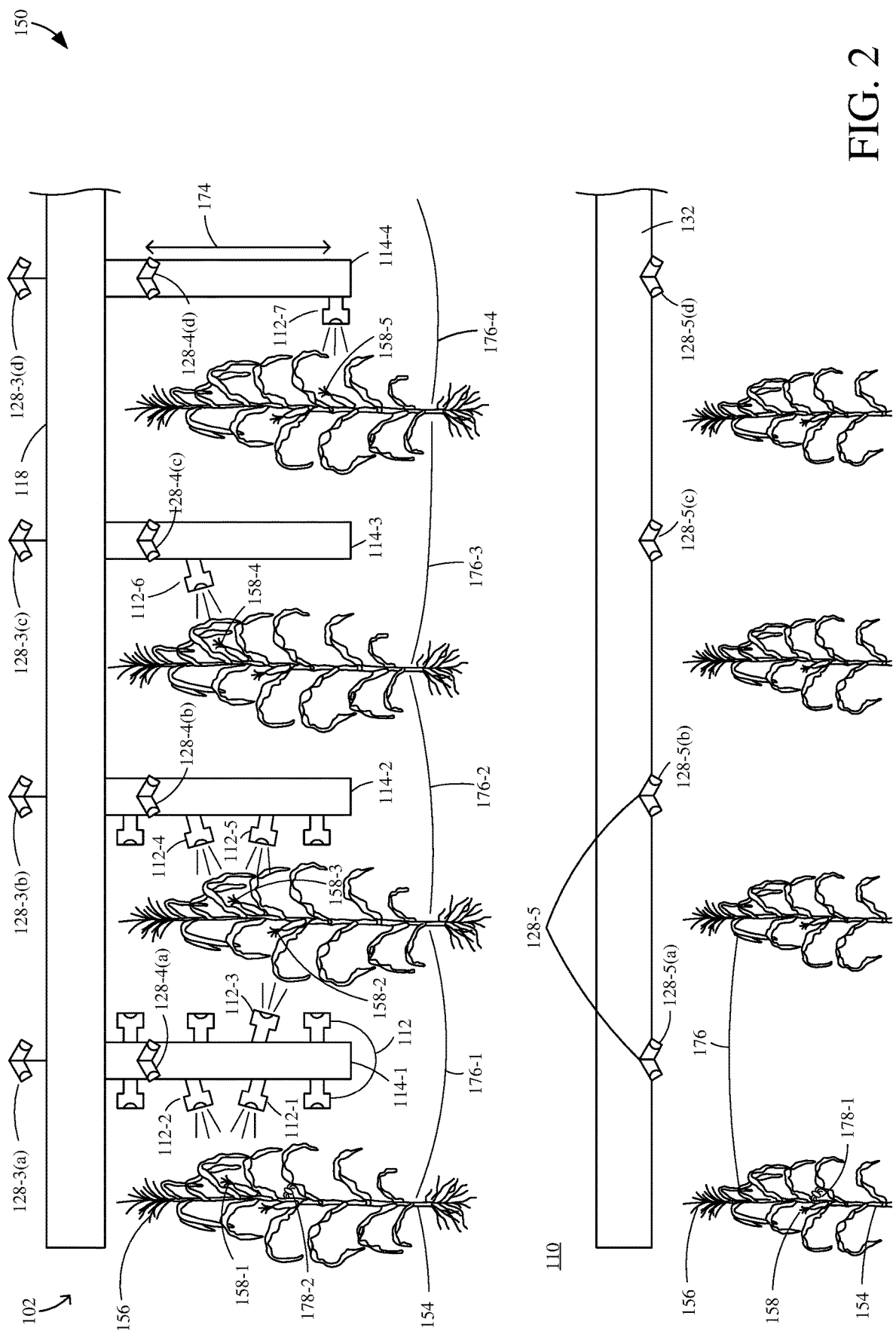
FIG. 2 is a pictorial illustration of one example of a portion of an agricultural sprayer.

FIG. 2 illustrates an agricultural environment 150 in which a portion of agricultural sprayer system 102 is shown traveling over an agricultural surface 110. FIG. 2 shows that the spray nozzles can be mounted on one or more locations of the vertical spray arms 114. For example, there can be a plurality of individually controllable spray nozzles disposed on both sides of a vertical spray arm 114, as shown for vertical spray arm 114-1. There can be a number of individually controllable spray nozzles disposed on only one side of a vertical spray arm 114, as shown with vertical spray arm 114-2. There can be a single controllable spray nozzle in a fixed location disposed on only one side of a vertical spray arm 114, as shown for vertical spray arm 114-3. There can be a single controllable spray nozzle disposed on one side and operably movable along a vertical axis 174 of a vertical spray arm 114, as shown for vertical spray arm 114-4. It is noted that these are only some examples of the number, locations and operability of the spray nozzles 112, and that any number of spray nozzles 112 can be mounted at various locations within sprayer system 102 (e.g., vertical spray arms 114, along the sprayer boom 116 such as along arms 118 and 120), and operable in any number of ways, including those shown in FIG. 2, or any combinations thereof.

While specific examples are shown in FIG. 2, it is to be understood that any number of examples or combinations thereof are contemplated herein, including, but not limited to any number of spray nozzles disposed in any number of locations along vertical spray arms or a boom arm, each individual spray nozzle being static or controllable in any number of ways. In other examples, the operation, orientation, or position of individual vertical spray arms 114-1 to 114-4 can be controlled. For example, but not by limitation, spray arms 114-1 to 114-4 can be retracted or extended or their orientation (e.g., tilt) can be adjusted. This can be done using actuators or manually. Additionally, while vertical spray arms 114 are shown in the example in FIG. 2, this need not be the case. In one example, spray nozzles 112 can be coupled to and spaced apart along boom arm 118. Furthermore, the spray nozzles can be configured to travel through the crop (e.g., between the rows and below the crop canopy) or over the crop (e.g., above the canopy). All of these, and other configurations, are contemplated herein.

FIG. 2 also shows that sensors can be mounted in various locations. For example, sensors 128-3 can be mounted on boom arm 118. Sensor 118-4 can be mounted on vertical spray arms 114, so they travel between the crop rows 116 and below the crop canopy. They are shown proximate a top portion of vertical spray arms 114 but they can be mounted at other locations as well. Sensors 128-5 are shown in an example where sensor boom 132 is used. They can be mounted to sensor boom 132 at a variety of different locations. Sensor boom 132 can have vertically oriented arms, like arms 114, with sensors mounted on them as well. These are examples only. Some of the various sensor and nozzle configurations will now be discussed in more detail.

Environment 150 includes field 110, corn plants 154, tassels 156, silks 158, crop rows separated by row spacing 176 and pests 178. As agricultural sprayer system 102 travels over field 110, sensor boom arm 132 travels ahead of spray nozzles 112 and above the crop (e.g., corn plants 154). Although, in other examples it can have depending arms configured to travel between the crop rows. Sensors 128-5 sense a characteristic of the crop and/or agricultural surface. For example, sensors 128-5 can sense a position of a component of corn plants 154 (e.g., position of silks 158). In another example, sensors 128-5 can sense a presence of pests 178 (e.g., quantity, type, position on plant, etc.). For instance, sensors 128-5 can be optical sensors or other sensors. Sensors 128-5 generate sensor signals indicative of the sensed characteristic and provide them to a control system (discussed in more detail below) which can generate control signals to control one or more of the controllable subsystems of sprayer system 102 based on the sensor signals. For example, but not limited to, controlling operation, orientation, position, spray characteristics (e.g. spray pattern, volume, pressure, flow rate, etc.), etc. of spray nozzles 112.

As boom arm 118 travels behind sensor boom arm 132 and above the crop, vertical spray arms 114 depend from boom arm 118 and travel between the crop rows. Therefore, spray nozzles 112 are configured to apply a substance to corn plants 154. In some examples, the boom arm can be configured so nozzles 112 travel below the crop canopy. In the example illustrated in FIG. 2, the alignment of sensor boom arm 132 and boom arm 118 can be such that, for each crop row 176, there is a corresponding sensor 128-5, vertical spray arm 114 and number of spray nozzles 112. For example, the individual sensors 128-5(a) through 128-5(d) can generate sensor signals used to control spray nozzles 112 mounted to each individual vertical spray arm 114-1 to 114-4 respectively. Thus, the agricultural spray system can be controlled in a way that accounts for the plant characteristics and/or presence of pests for each plant 154 in each row 176 in field 110.

However, other systems and methods are contemplated herein. For example, a spray application map of field 110 can be generated prior to the agricultural spray system operating on field 110. A vehicle (e.g., Unmanned Aerial Vehicle [UAV], ground vehicle, etc.), having various sensors, can travel over field 110 and generate a spray application map indicative of characteristics of the plants (e.g., position of silks 158), or presence of pests (e.g., quantity, position, type, etc.) in field 110 which can be stored in memory and accessed by the agricultural spray system to control spray nozzles 112. Additionally, while a sensor boom arm 132 is shown, this need not be the case. For example, forward looking sensors on towing vehicle 104 (e.g., sensors 128-1) or sensors on implement 106 (e.g., sensors 128-2) can be used in addition to, or instead of the sensors 128-5 on sensor boom arm 132. Similarly, sensors on boom arm 118 (e.g., sensors 128-3) and/or sensors on vertical spray arms 114 (e.g., sensors 128-4) can be used (in addition to, or instead of, other sensors 128) to provide real-time or near real-time sensor signals indicative of characteristics of corn plants 154 or the presence of pests 178.

As mentioned above, in the example shown in FIG. 2, each vertical spray arm 114 can include a number of spray nozzles 112 and sensors 128-4. Vertical spray arms 114 include a wide variety of nozzle arrangements. For example, vertical spray arm 114-1 is shown with spray nozzles 112 on both sides, configured to apply a substance to plants in the rows on either side of arm 114-1. The operation, spray characteristics, orientation, and position of individual spray nozzles 112 can be controlled (e.g., automatically by a control system or manually by an operator). In some examples, the nozzles can be controlled individually to cover corn silks. In another example, they can be controlled in sets as an entire group.

In the example shown in FIG. 2, for instance, spray nozzles 112-1 and 112-2 are shown tilted at an angle relative to a longitudinal axis of arm 114-1 to better cover corn silk 158-1. In the case where the individual spray patterns of both nozzles 112-1 and 112-2 cover the position of corn silk 158-1, they can be controlled individually so that only one of them applies the substance to corn silk 158-1. Alternatively, if the corn silk is in such a position that multiple spray nozzles can be used to effectively cover it, then multiple spray nozzles 112 can be oriented and operated to spray the substance onto the corn silk. In the example shown in FIG. 2, spray nozzle 112-3 can be oriented and operated to apply substance to corn silk 158-2 while the remaining spray nozzles 112 may remain off. Additionally, if the corn plant has multiple silks on one side, multiple spray nozzles 112 can be individually controlled such that all of the silks are covered with the sprayed substance.

The example illustrated in FIG. 2 also shows a pest 178-2 located on corn plant 154. The position of pest 178-2 can be sensed by sensors 128-3, 128-4, and/or 128-5 (as well as other sensors 128 mounted on sprayer system 102) and a control system can control one or more of the spray nozzles 112 to apply spray to the detected position of pest 178-2. In one example, one spray nozzle can be controlled to apply substance to a detected position of a corn silk while another spray nozzle can be controlled to apply substance to a detected position of a pest. Similarly, a single spray nozzle can be dynamically controlled, using an actuator that controls where the spray nozzle is pointing, to first apply substance to a first position (e.g., detected position of pest, corn silk, etc.) and then to a second position (e.g., detected position of pest, corn silk, etc.).

Vertical spray arm 114-2 shows a nozzle configuration that includes spray nozzles 112 on one side configured to apply substance to plants on the corresponding side of crop row 176-2. As illustrated in FIG. 2, the individual orientation (e.g., tilt) of spray nozzles 112-4 and 112-5 is controlled such that their respective spray patterns cover corn silk 158-3. Again, the nozzles 112-4 and 112-5 can be aimed by controlling an actuator that drives movement of the nozzle or by an operator.

Vertical spray arm 114-3 shows a nozzle configuration that includes a single spray nozzle 112-6 that can be in a fixed position on a side of vertical spray arm 114-3 but the orientation (e.g., tilt) can be controlled (e.g., automatically by a control system and an actuator, or manually by an operator, etc.) such that spray nozzle 112-6 desirably applies a substance to plants on one side of crop row 176-3. In the example shown in FIG. 2, spray nozzle 112-6 is tilted at a downward angle such that its spray pattern will cover corn silk 158-4.

Vertical spray arm 114-4 shows a nozzle configuration that includes a single spray nozzle 112-7 that is operably moveable along a side of vertical spray arm 114-4 (in the direction indicated by arrow 174) such that its spray pattern will cover corn silk 158-5 on the corresponding side of crop row 176-4. The position and movement of spray nozzle 112-7 can be controlled, for example, automatically by a control system and an actuator or manually by an operator.

As mentioned above, boom arm 118 and vertical spray arms 114 can include sensors 128-3 and 128-4 respectively. Sensors 128-3 and 128-4 can be multi-purpose sensors. For example, sensors 128-3 or 128-4 can be optical sensors that provide real-time or near real-time sensor signals indicative of a position of a component of a plant on field 110 (e.g., position of corn silks 158 on corn plants 154) or the presence of pests (e.g., quantity, type, position of pests 178), or both, for the control of spray nozzles 112.

Additionally, sensors 128-3 or 128-4 can be used for closed-loop control of the agricultural sprayer system 102. For example, sensors 128-3 or 128-4 can be used to detect and control the coverage of the applied substance for purposes of quality control or to detect error conditions of the agricultural sprayer system. As an example, sensors 128-3 or 128-4 can detect that the substance being sprayed is not adequately covering the plants (e.g., not covering the detected positions of corn silks or pests). In such a case, adjustments can be made to the agricultural sprayer system to compensate. For example, but not by limitation, an adjustment can be made to the operation, spray characteristics, orientation or position of spray nozzles 112 or the output (e.g., fluid pressure, type of substance, quantity, etc.) of the fluid pump that delivers fluid from the fluid tank 108. For instance, upon the detection of pests 178 a determination can be made by the control system as to the type and quantity of pests 178. A control signal can then be generated to control an amount and/or type of substance output by the tank 108.

In another example, sensors 128-3 or 128-4 can detect that one or more of spray nozzles 112 is not operating (e.g., it is plugged). In such a case, an indication of an operating error can be surfaced to a user (e.g., it can be surfaced on a user interface in cab 124 of towing vehicle 104 or to a remote user, such as a handheld device or remote user interface). It should also be understood that the sensors discussed with reference to FIGS. 1 and 2, and others that will be discussed further herein, can comprise any number of sensors configured to sense or otherwise detect any number of characteristics.

Figure 3:
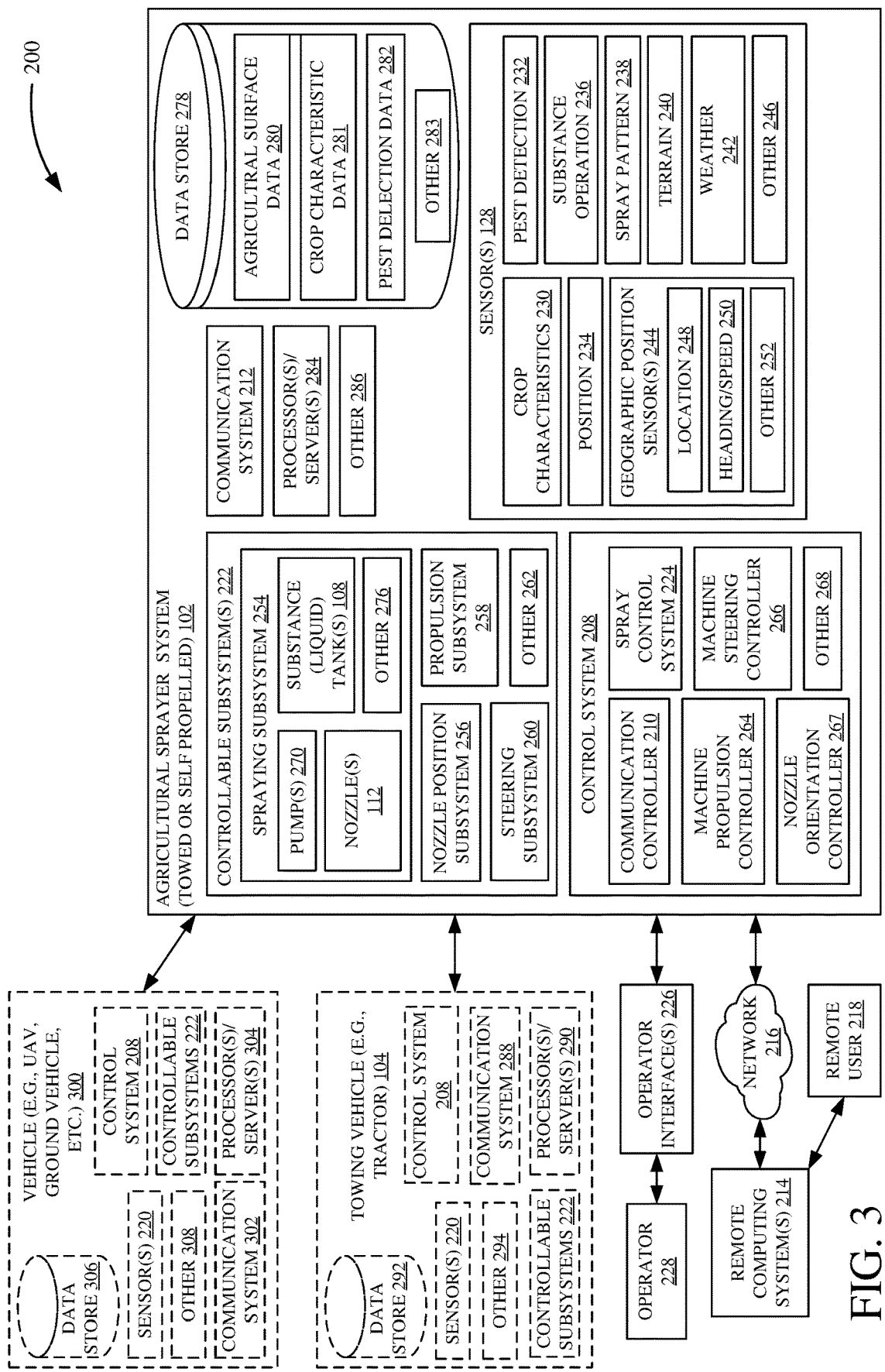
FIG. 3 is a block diagram of one example of an agricultural spraying system architecture.

FIG. 3 is a block diagram of one example of an agricultural spraying system architecture 200 having an agricultural sprayer system 102 configured to perform a spraying operation on an agricultural surface, such as field 110. Some items are similar to those shown in FIGS. 1 and 2 and they are similarly numbered. FIG. 3 shows that agricultural sprayer system can include a control system 208, one or more controllable subsystems 222, communication system 212, one or more processors or servers 284, data store 278 and it can include other items 286. Control system 208 can include communication controller 210, spray control system 224, machine propulsion controller 264, machine steering controller 266 and it can include other items 268. Controllable subsystems 222 can include spraying subsystem 254, nozzle position subsystem 256, propulsion subsystem 258, steering subsystem 260 and it can include other items 262. Spraying subsystem 254, itself, can include one or more pumps 270, one or more substance tanks 108, nozzles 112 and it can include other items 262.

FIG. 3 also shows that sensor(s) 128 can include any number of different types of sensors that sense or otherwise detect any number of characteristics. In the illustrated example, sensor(s) 128 include crop characteristic sensor(s) 230, pest detection sensor(s) 232, positional sensor(s) 234, substance operation sensor(s) 236, spray pattern sensor(s) 238, terrain sensor(s) 240, weather sensor(s) 242, geographic position sensor(s) 244, and can include other sensor(s) 246 as well.

Sprayer system 102 can comprises a towed implement (as shown in FIG. 1) or it can be self-propelled. FIG. 3 illustrates this with a dashed box 104 representing a towing vehicle, such as a tractor that is coupled to sprayer system 102 through one or more links 206 (electrical, mechanical, hydraulic, pneumatic, etc.).

Control system 208 is configured to control other components and systems of sprayer system 102. For instance, communication controller 210 is configured to control communication system 212. Communication system 212 is used to communicate between components of sprayer system 102 and/or with other systems, such as remote computing system(s) 214 over a network 216. Network 216 can be any of a wide variety of different types of networks such as the Internet, a cellular network, a wide area network (WAN), a local area network (LAN), a controller area network (CAN), a near-field communication network, or any of a wide variety of other networks or combinations of networks or communication systems.

A remote user 218 is shown interacting with remote computing system(s) 214. Remote computing system(s) 214 can be a wide variety of different types of systems. For example, remote computing system(s) 214 can be in a remote server environment. Further, it can be a remote computing system (such as a mobile device) a remote network, a farm manager system, a vendor system, or a wide variety of other remote systems. Remote computing system(s) 214 can include one or more processors or servers, a data store, and it can include other items as well.

Before discussing the overall operation of agricultural sprayer system 102, a brief description of some of the items in system 102, and their operation, will first be provided.

Communication system 212 can include wireless communication logic, which can be substantially any wireless communication system that can be used by the systems and components of sprayer system 102 to communicate information to other items, such as between control system 208, sensor(s) 128, controllable subsystem(s) 222, and spray control system 224. In another example, communication system 212 communicates over a controller area network (CAN) bus (or another network, such as an Ethernet network, etc.) to communicate information between those items. This information can include the various sensor signals and output signals generated by the sensor characteristics and/or sensed characteristics, and other items.

Crop characteristic sensor(s) 230 are configured to sense various characteristics relative to crops and crop plants on an agricultural surface. For example, crop characteristic sensor(s) 230 can be configured to sense a position of a component of a crop plant. For illustration, but not by limitation, crop characteristic sensor(s) 230 can sense a height of corn silks 158 on a corn plant 154.

Pest detection sensor(s) 232 are configured to sense various characteristics relative to the presence of pests on an agricultural surface. For example, pest detection sensor(s)

can be configured to sense a quantity, a position and/or a type of pest on an agricultural surface. For instance, pest detection sensor(s) 232 can sense a quantity of pests on corn silks 158 as well as the type of pest, as well as the pests position (e.g., on the corn silks).

Position sensor(s) 234 are configured to sense position information relative to various components of agricultural spraying system 202. For example, a number of position sensor(s) 234 can be disposed at locations extending along the boom arm(s) 118, sensor boom arm(s) 132, vertical spray arm(s) 114, sprayer nozzle(s) 112, etc. They can thus detect a position and/or orientation of the boom arm(s), the sensor boom arm(s), the vertical spray arm(s), the sprayer nozzle(s) etc., relative to other components of sprayer system 102 and/or components of the agricultural environment, such as the ground. Position sensor(s) 234 can, for example, sense a height and/or orientation (e.g., tilt) of one or more of the components of sprayer system 102. For instance, position sensor(s) 234 can sense the height of the sprayer nozzle(s) relative to the ground, the distance and/or height of the sprayer nozzle(s) from corn silks 158, etc. In another example, once the position of a sensor is detected, then, by knowing the dimensions of the sprayer, the position and orientation of other items can be calculated.

Substance operation sensor(s) 236 are configured to sense characteristics relative to the substance to be sprayed by sprayer system 102. For example, substance operation sensor(s) 236 can sense operational characteristics of the spraying subsystem 254. For illustration, but not by limitation, substance operation sensor(s) 236 can sense the pressure of fluid within the substance tank(s) 272, the pressure at which the fluid pump(s) 270 are pumping the substance, a flow rate of the substance through the conduits, the pressure of the fluid within the conduits, along with various other characteristics of the operation of the substance to be sprayed within sprayer system 102.

Spray pattern sensor(s) 238 are configured to sense the spray from the spray nozzles (e.g., 112). For example, but not by limitation, spray pattern sensor(s) 238 can sense the spray distance (e.g., distance of nozzle tip to target), the spray angle, spray coverage, spray impact, spray pattern shape (e.g., fan, cone, solid stream, flat, etc.) along with various other characteristics relative to a sprayed substance.

Terrain sensor(s) 240 are configured to sense characteristics of the agricultural surface (e.g., field 110) over which sprayer system 102 is traveling. For instance, terrain sensor(s) 240 can detect the topography of the field (which may be downloaded as a topographical map or sensed with sensors) to determine the degree of slope of various areas of the field, to detect a boundary of the field, to detect obstacles or other objects on the field (e.g., rocks, root-balls, trees, etc.), among other things.

Weather sensor(s) 242 are configured to sense various weather characteristics relative to the agricultural surface. For example, weather sensor(s) 242 can detect the direction and speed of wind traveling over the agricultural surface over which sprayer system 102 is traveling. They can detect precipitation, humidity, temperature or other conditions. This information can be obtained from a remote weather service as well.

Geographic position sensor(s) 244 include location sensor(s) 248, heading/speed sensor(s) 250, and can include other sensor(s) 252 as well. Location sensor(s) 248 are configured to determine a geographic location of sprayer system 102 on the field. Location sensor(s) 248 can include, but are not limited to, a Global Navigation Satellite System (GNSS) receiver that receives signals from a GNSS satellite transmitter. It can also include a Real-Time Kinematic (RTK) component that is configured to enhance the precision of position data derived from the GNSS signal. They can include other satellite-based sensors, cellular triangulation sensors, dead reckoning sensors, etc.

Heading/speed sensor(s) 250 are configured to determine a heading and speed at which sprayer system 102 is traversing the field during the spraying operation. This can include sensors that sense the movement of ground-engaging elements (e.g., wheels or tracks 126) and/or can utilize signals received from other sources, such as location sensor(s) 248.

Sensor(s) 128 can comprise any number of different types of sensors. For example, but not by limitation, sensor(s) 128 can include potentiometers, Hall Effect sensors, various mechanical and/or electrical sensors. Sensor(s) 128 can also comprise various electromagnetic radiation (ER) sensors, optical sensors, imaging sensors, thermal sensors, LIDAR, RADAR, Sonar, radio frequency sensors, audio sensors, inertial measurement units, accelerometers, pressure sensors, flowmeters, etc. Additionally, while multiple sensors are shown, sensor(s) 128 can comprise a single sensor configured to produce a single sensor signal indicative of multiple characteristics. For instance, sensor(s) 128 can comprise an imaging sensor mounted on sprayer system 102, towing vehicle 104, or other vehicles 300. The imaging sensor can generate an image that is indicative of both characteristics relative to pest detection (e.g., type, position, quantity, etc.) as well as characteristics relative to the crop (e.g., position of silks on corn). Additionally, it is to be understood that some or all of the sensor(s) 128 can be a controllable subsystem of sprayer system 102. For example, control system 208 can generate a variety of control signals to control the operation, position, orientation as well as various other operating parameters of sensor(s) 128. For instance, because the leaves on a corn plant can obscure the line of view for detecting a corn silk, sensor(s) 128 can be controlled to adjust their position and/or orientation to adjust thereby their line of sight to the corn plant and thus the corn silk.

Controllable subsystem(s) 222 illustratively include spray subsystem 254, nozzle position subsystem 256, propulsion subsystem 258, steering subsystem 260 and can include other subsystems 262 as well. The subsystems 222 are now briefly described.

Spraying subsystem 254 includes one or more pumps 270 configured to pump substance (e.g., pesticide, insecticide, etc.) from substance tank(s) 108 through conduits to spray nozzle(s) 112 which can be mounted on, for example, a boom, on vertical spray arms, as well as various other locations on sprayer system 102. Spraying subsystem 254 can include other items as well. For example, spraying subsystem 254 can include a valve subsystem that can include a variety of controllable valves placed in various locations within spraying system 102. For instance, some or each of spray nozzle(s) 112 can have an associate valve (e.g. pulse-width modulation valve, solenoid, etc.) that can be controllably operated, for example, controllably operated between an on (e.g. open) and off (e.g. closed) position, as well as controlling the flow of substance through the valves (e.g. flow rate). Additionally, controllable valves can be placed along the fluid conduit (e.g. extending from the pump to the spray nozzle(s) 112 to control the flow of substance through the fluid conduit.

Substance tank(s) 108 can comprise multiple hoppers or tanks, each configured to separately contain a different type of substance (e.g., different types of pesticide/insecticide) which can be selectively pumped by pump(s) 270 through conduits to spray nozzle(s) 112. For instance, upon pest detection sensor(s) 234 sensing the presence of a type of pest on an agricultural field 110 and generating sensor signal(s) indicative of the sensed presence, spray control system 224 can determine, for example, the type, quality, position, etc., of pests on the agricultural surface and generate a control signal to control pump(s) 270 to pump substance from one of the multiple hoppers containing the desired pesticide based on the sensor signal. In another example, pump(s) 270 can have controllable operational variables (e.g., pressure, speed, flowrate, etc.) that can be controlled by control system 208. For example, but not by limitation, upon crop characteristic sensor(s) 232 sensing the position of silks 158 relative to corn plant 154 on the agricultural surface and generating sensor signal(s) indicative of the sensed position, spray control system 224 can determine, for example, the position (e.g., height relative to the ground) of the corn silk 158 on the corn plant 154 and generate a control signal to control pump(s) 270 to increase or decrease the operating pressure of pump(s) 270 based on the sensor signal.

Nozzle position subsystem 256 is configured to move various components of agricultural sprayer system 102. For example, nozzle position subsystem 256 can include a number of actuators (such as electrical, pneumatic, hydraulic or mechanical actuators) that are coupled to various components to adjust a position and/or orientation of the various components. For instance, nozzle position subsystem 256, in one example, can aim the nozzles by adjusting a position (such as the height) and/or orientation (e.g., tilt or direction of spray) of spray nozzle(s) 112. In another example, nozzle position subsystem 256 can adjust a position and/or orientation of vertical spray arms 114. Position subsystem 256 can, in one example, adjust the position and/or orientation of spray nozzle(s) 112 and/or vertical spray arms 114 based upon control signals generated by spray control system 224, which can be based on the sensed position of corn silks 158 on corn plants 154 by crop characteristic sensor(s) 232 or the presence of pests on the agricultural surface such that the substance is sprayed on the corn silks, or is applied to the pests.

Propulsion subsystem 258 is configured to propel sprayer system 102 over the agricultural surface. It can include a power source, such as an internal combustion engine or other power source, and a set of ground-engaging elements (e.g., wheels or tracks 126). In one example, propulsion system 258 can adjust the speed of sprayer system 102 based on control signals received from machine velocity controller 264, which can be based on a detected wind speed and/or direction by weather sensor(s) 242.

Steering subsystem 260 is configured to control the heading of sprayer system 102, by steering the ground-engaging elements (e.g., wheels or tracks 126). Steering subsystem 260 can adjust the heading of sprayer system 102 based on control signals generated by control system 208. For example, based on a sensed location from location sensor(s) 248, machine steering controller 266 can generate control signals to control steering subsystem 260 to adjust the heading of sprayer system 102 to comply with a desired course based on a spray application map.

The application map can be generated based upon, for example, characteristics (e.g., position of corn silks on corn plants, presence of pests, etc.) of the agricultural surface sensed by various sensors on a UAV or ground vehicle that travels over the agricultural surface prior to sprayer system 102 commencing a spraying operation on the surface. In another example, based on sensed characteristics of the agricultural surface (e.g., the sensed position of corn silks, the presence of pests), machine steering controller 266 can generate control signals to control steering subsystem 260 to adjust the heading of sprayer system 102 to control the distance of spray nozzle(s) 112 relative to the plants. These are examples only.

Control system 208 is configured to receive sensor signals from sensor(s) 128 indicative of various characteristics, as well as from other components of sprayer system 102 (e.g., data store 278). System 208 generates a variety of control signals to control controllable subsystems 222 based on the received sensor signals.

Spray control system 224 controls the spraying operation and performance of sprayer system 102. For example, it can generate control signals for spraying subsystem 254 to adjust a position and/or orientation of spray nozzle(s) 112 based on sensor signals received from sensor(s) 128. Spray control system 224 can generate control signals for spraying subsystem 254 to adjust the flow and/or pressure of the substance to be sprayed to and through spray nozzle(s) 112, for instance by controlling the operation of a valve associated with the spray nozzle, such as a pulse-width modulation valve. Machine propulsion controller 264 controls the velocity of sprayer system 102 by generating control signals for propulsion subsystem 256. Machine steering controller 266 controls the heading of sprayer system 102 by generating control signals for steering subsystem 260.

Sprayer system 102 includes a data store 278 configured to store data for use by sprayer system 102, such as agricultural surface data 280, which can include a variety of data relative to field 110, crop characteristic data 281, which can include a variety of data relative to the crop (e.g., position of corn silks 158 on corn plants 154), pest detection data 282, which can include a variety of data relative to the presence of pests on the agricultural surface (e.g., position, quantity, type of pests, etc.), as well as other data 283.

Sprayer system 102 also includes one or more processors or servers 284. It can include other items 286 as well.

As illustrated in FIG. 3, a towing vehicle 104 (or vehicle) can tow agricultural spraying machine 102. Towing machine 104 can include a communication system 288 configured to communicate with communication system 212 or with, for example, remote computing system(s) 214 over network 216. Towing machine 104 can also include one or more processors or servers 290, a data store 292, and it can include other items 294 as well. Additionally, as illustrated, towing machine 104 can include control system 208, sensor(s) 128 and controllable subsystem(s) 222.

Architecture 200 further includes other vehicle(s) 300 (e.g., UAV, ground vehicle, etc.). As mentioned above with reference to FIGS. 1 and 2, additional vehicles 300 can be used in the performance of a spraying operation on an agricultural surface. For example, a UAV or ground vehicle 300 traveling over the agricultural surface, can be used to sense a variety of characteristics relative to the agricultural surface. These can characteristics can include position of components of crop plants, presence of pests, etc. Vehicle 300 can also generate control signals to control the operation of the agricultural sprayer system 102 (e.g., generate a spray application map, used by machine steering controller 206, and other items, to control the heading of agricultural machine 202, the application of herbicide/pesticide, etc.). In another example, a UAV or ground vehicle can travel over the agricultural surface after/behind the agricultural spraying machine and sense a variety of characteristics (e.g., performance or quality of spray application) and can generate a variety of control signals to control sprayer system 102. In yet another example, a UAV or ground vehicle can include a dispenser that applies the substance to the agricultural surface. For instance, a UAV can fly over the surface behind sprayer system 102, and upon detection of an insufficient application of the substance, apply additional substance to a particular crop plant or area.

Vehicle(s) 300 can include a communication system 302 configured to communicate with communication system 212 or with, for example, remote computing system(s) over network 216, one or more processors or servers 304, a data store 306, and can include other items 308 as well. Additionally, as illustrated, other vehicle(s) 300 can include control system 208, sensor(s) 128 and controllable subsystem(s) 222.

Figure 4:
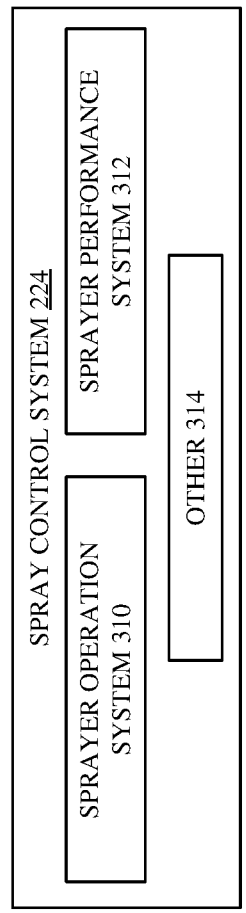
FIG. 4 is a block diagram of one example of a spray control system, in more detail.

FIG. 4 is a block diagram illustrating one example of spray control system 224 in more detail. Spray control system 224 can include sprayer operation system 310, sprayer performance system 312, and it can include other items 314 as well. Sprayer operation system 310 generates control signals to control the operation of components of the agricultural sprayer (e.g., controllable subsystem(s) 222). Sprayer performance system 312 determines the spray performance of the agricultural sprayer and generates control signals to control the operation of components of the agricultural sprayer (e.g., controllable subsystem(s) 222).

Spray control system 224 controls the operation and performance of spraying subsystem 254. For example, spray control system 224 can generate control signals for the control of spray nozzle(s) 112 to change an operation, spray characteristic, position or orientation of spray nozzle(s) 112. In another example, system 224 can generate control signals to control one or more controllable valves disposed along the fluid conduit and/or associated with the one or more of spray nozzle(s) 112, for instance, operably controlling the valve(s) between an open or closed position, controlling the flow of substance through the valves, etc. In another example, system 224 can generate control signals for the control of pump(s) 270 to change an operating speed or pressure of pump(s) 270. The control signals generated by sprayer control system 224 can be based on a variety of sensor signals generated by sensor(s) 128 (e.g., sensed position of corn silks on a corn plant sensed by crop characteristic sensor(s) 230, sensed presence of pests such as position, quantity, type of pests, etc. by pest detection sensor(s) 232, etc.). The control signals generated by system 224 can also be based on various other sources, for example, data retrieved from a data store such as data store 278.

Figure 5:
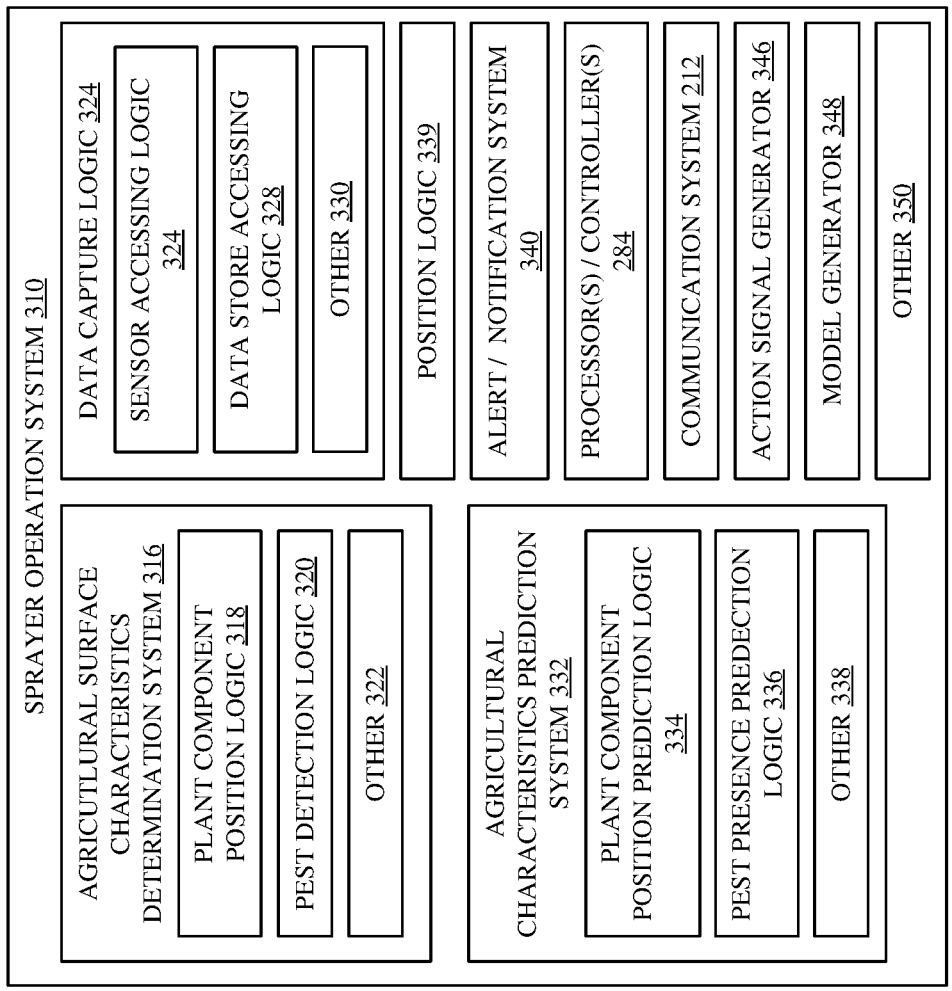
FIG. 5 is a block diagram of one example of a sprayer operation system, in more detail.
Figure 6:
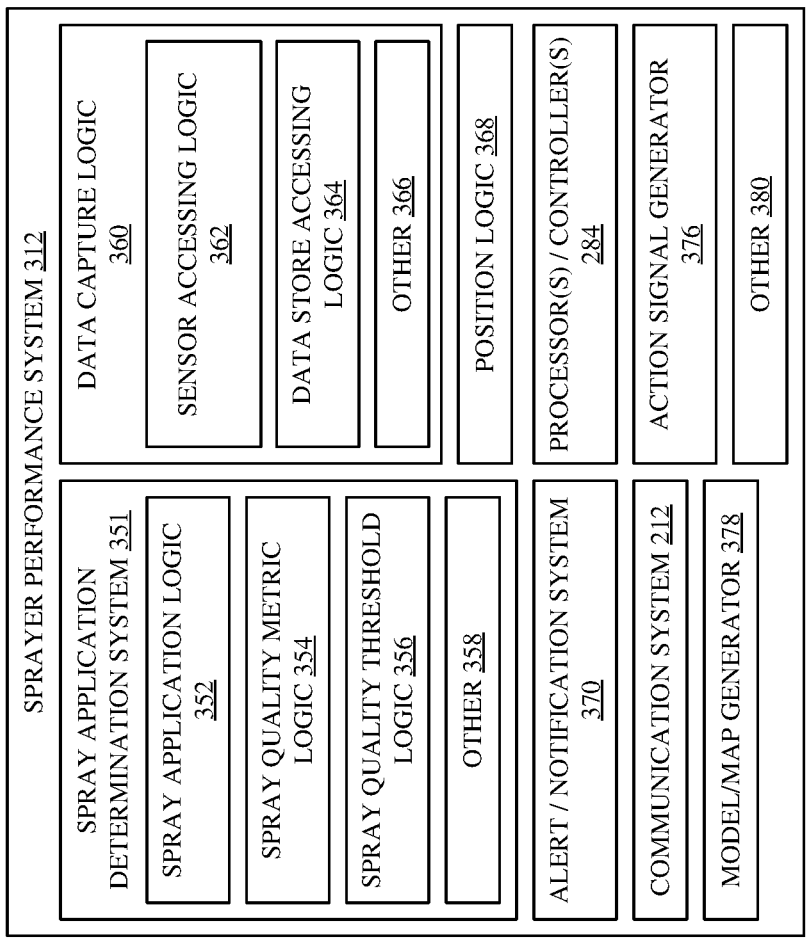
FIG. 6 is a block diagram of one example of a sprayer performance system, in more detail.

FIG. 5 is a block diagram illustrating one example of sprayer operation system in more detail. Sprayer operation system 310 includes agricultural surface characteristics detection system 316, data capture logic 324, agricultural surface characteristics prediction system 332, position logic 339, alert/notification system 340, processor(s)/controller(s) 284, communication system 212, action signal generator 346, model generator 348, and can include other items 350 as well. Agricultural surface characteristics determination system can include plant component position logic 318, pest detection logic 320 and it can include other items 322 as well. Data capture logic 324 can include sensor accessing logic 324, data store accessing logic 328 and it can include other items 330 as well. Agricultural surface characteristics prediction system 332 can include plant component position prediction logic 334, pest presence prediction logic 336 and it can include other items 338 as well.

In operation, sprayer operation system 310 determines and/or predicts characteristics relative to the agricultural surface over which the agricultural spray system operates. For example, sprayer operation system 310 can determine and/or predict the position of components of plants on the agricultural surface (e.g., position of silks 158 on corn plants 154) or determine and/or predict characteristics relative to the presence of pests on the agricultural surface (e.g., position, quantity, type of pest, etc.). Upon determining and/or predicting the characteristics relative to the agricultural surface, action signals are generated and used to, for instance, control the operation of agricultural sprayer system 102 or to generate displays, recommendations, and/or other indications (e.g., alerts).

Data capture logic 324 captures or obtains data that can be used by other items on sprayer operation system 310. Data capture logic 324 can include sensor accessing logic 326, data store accessing logic 328, and other logic 330. Sensor accessing logic 326 can be used by agricultural surface characteristics determination system 316 and/or agricultural surface characteristics prediction system 332 to obtain sensor data (or values indicative of the sensed variables) provided from sensor(s) 128 that can be used to determine and/or predict agricultural surface characteristics. In one example, sensor accessing logic 326 receives sensor signals indicative of a position of a component of a plant on a crop field (e.g., position of a corn silk on a corn plant), from sensors 128. In another example, sensor accessing logic 326 receives sensor signals indicative of a presence of pests on a crop field (e.g., position, quantity, type of pest, etc.), from sensors 128.

Additionally, data store accessing logic 328 can be used to obtain data previously stored on a data store (e.g., one or more of data stores 278, 292, 306) and/or data previously stored at remote computing system(s) 214. For example, this can include data that was sensed and stored during a previous agricultural operation, or otherwise sensed and stored previously. This data can include crop characteristic data (e.g., position of components on crop plants), pest data (e.g., presence, position, quantity, type of pest, etc.), dimensional and position data (e.g., dimensions of various components of the agricultural sprayer, geographical position of the agricultural sprayer, etc.), substance operation data (e.g., operating pressure, type of substance), spray pattern data (e.g., spray coverage), weather data (e.g., wind/speed direction), terrain data (e.g., topographical information), as well as various other types of data.

Upon receiving sensor data or indications of the sensed characteristics, agricultural surface characteristics detection system 316 can determine characteristics of the agricultural surface. This can include plant component position logic 318 determining the position of components of crop plants. For instance, logic 318 can determine the position of corn silks on a corn plant. This can also include pest detection logic 320 determining characteristics relative to pests on the agricultural surface, such as, the presence of pests, the position of pests on the crop plant, the quantity of pests, the type of pests (e.g., Japanese beetle, corn rootworm, beetle), etc. Various other types of determinations of characteristics relative to the agricultural surface can also be made by other logic 322.

Based on the determined characteristics, agricultural surface detection system 316 can generate various indications via alert/notification system 340. This can be done, for example, by surfacing a display or other indication to operator interface(s) 226 for operator 228. It can also be done by surfacing a display or other indication to remote computing system(s) 214 for remote user 216. Additionally, agricultural surface detection system 316 can generate various control signals via action signal generator 346 to control various subsystems (e.g., controllable subsystem(s) 222) of agricultural sprayer system 102, towing vehicle 104, and other vehicles 300.

For instance, upon determination of the height of a corn silk on a corn plant, agricultural surface detection system 316 can generate a control signal to control the operation, position, orientation (e.g., tilt), etc. of the spray nozzles (e.g., 112) such that they apply a substance to the corn silks. In another example, upon determination of a characteristic relative to pests on the agricultural surface, agricultural surface detection system 316 can generate a control signal to control various components of spraying subsystem 254. For instance, upon determination of a type of pest, system 316 can generate a control signal to control pump(s) 270 and/or substance tank(s) 108 to control the type of pesticide/insecticide being provided to spray nozzle(s) 112 or the pressure at which the substance is provided to spray nozzle(s) 112. These are examples only.

As illustrated in FIG. 5, sprayer operation system 310 includes agricultural characteristics prediction system 332. Agricultural characteristics prediction system 332 includes plant component position prediction logic 334, pest presence prediction logic 336, and can include other logic 338 as well. Prediction system 332 determines likely characteristics relative to the agricultural surface over which the agricultural sprayer operates. These determinations can be based on a variety of data that be accessed in real-time or near real-time via sensor accessing logic 326, or data (e.g., historical data, management data, such as hybrid or cultivar of the crop plant, user/operator input data, etc.) can be accessed in a data store via data store accessing logic 328. Additionally, prediction system 332 can update the determinations periodically or intermittently either prior to or throughout a spraying operation. These determinations can be provided to operator 228 on operator interface(s) 226, to remote computing system(s) 214, to remote user 218, to control system 208, or to model generator 348, as well as various other components of sprayer system 102.

Plant component position prediction logic 334 determines the likely positions of components on crop plants on the agricultural surface. For example, plant component position prediction logic 334 can determine the likely position of silks on a corn plant based on the data captured by data capture logic 324. Similarly, logic 334 can determine the likely position of silks on a corn plant based on typical/expected positions. By way of example, the silks on corn plants are often located approximately halfway up the corn stalk between leaves 12 and 13 (e.g., V12 and V13), though this can vary with specific hybrids or cultivars. In another example, pest presence prediction logic 336 can determine the likely characteristics relative to pest presence on the agricultural surface, such as the likely position of pests on plants, and the quantity and/or the type of pest. The position of pests on a corn plant can, for example, be predicted based on the fact that certain types of pests feed on certain types of crop, and more particularly feed on certain components of certain crops. Japanese beetles and corn rootworms, for example, tend to feed on corn silks. Thus, when the position of silks is identified the likely position of pests can be identified as well. Similarly, pest presence prediction logic 336 can determine the likely position and type of pests based on, for example, the type of crop growing on the agricultural surface, the growth stage of the plant, etc. Also, logic 336 can determine the likely quantity of pests based on a variety of factors, including, but not limited to, the quantity of crop, growing conditions, weather conditions, historical data, etc. The data used by prediction system 332 can be accessed at a data store (e.g., one or more of data stores 278, 292, 306) by data store accessing logic 328 or it can be detected by sensors 128 and accessed by sensor accessing logic 324.

Sprayer operation system 310 also includes model generator 348 configured to generate a model of a worksite (e.g., agricultural surface or field) to be sprayed. In one example, the model can output an indication of what the characteristics of any particular worksite are likely to be. For instance, model generator 348 can generate a model that provides an indication of what the likely position of silks on corn plants are going to be, or what the likely characteristics of pest presence are going to be (e.g., quantity, position on the plants, type of pest, etc.). The model can be generated based on a variety of past or present data, including, but not limited to, data relevant to growing conditions (e.g., weather, soil characteristics, etc.), historical data (e.g., previous data collected for the particular agricultural surface), management data such as hybrid or cultivar of the crop plant, etc. This data can be accessed in real-time or near real-time via sensor accessing logic 326, or historical and/or management data can be accessed in a data store via data store accessing logic 328. Additionally, model generator 348 can update the model periodically or intermittently either prior to or throughout a spraying operation. The output of the generated model (which can indicate current or likely characteristics relative to the agricultural surface) can be provided to operator 228 on operator interface(s) 226, to remote computing system(s) 214, to remote user 218, and/or to control system 208, as well as various other components of sprayer system 102.

In a particular example, model generator 348 can generate a predictive model of an agricultural surface that can be used by sprayer system 102 and/or control system 208 to control the operation and/or position of various controllable subsystems 222. For instance, model generator 348 can generate a predictive model that outputs the likely position of silks on corn plants, and based on this model output, control system 208 can control the operation and/or position of spray nozzle(s) 112, for example, position spray nozzle(s) 112 at a certain position or orientation such that their spray patterns will cover the expected position of the corn silks. Similarly, control system 208 can position the sensors 128 at a certain position or orientation such that their field of view will cover (and thus sense) the expected position of the corn silks. Using corn as an example, the various leaves can interfere with sensing the position of the corn silks (e.g., the leaves cover the silks from certain viewpoints) and thus the sensors may need to view the plants at an angle. Control system 208 can thus position the sensors 128 so they have a relatively clear view of the likely position of the silks.

Sprayer operation system 310 can also include position logic 339. Position logic 339 determines position information (e.g., height, orientation, distance, etc.) relative to various components of the agricultural sprayer. For instance, position logic 339 can determine the height of spray nozzle(s) 112 of sprayer system 102 from the agricultural surface. Similarly, position logic 339 can determine the distance between spray nozzle(s) 112 of agricultural sprayer system 102 and corn silks. Additionally, position logic 339 can determine the orientation of spray nozzle(s) 112 of sprayer system 102. These determinations can be used by control system 208 to adjust the operation of agricultural sprayer system 102. For example, based on the known position of a corn silk on a corn plant at a given geographic location, and a known position (e.g., height, orientation, distance, etc.) of spray nozzle(s) 112, control system 208 can generate control signals to adjust the operation and/or position of spray nozzle(s) 112 such that they are configured to apply the substance to the position of the corn silk.

In one example, sprayer operation system 310 can include alert/notification system 340 to generate alerts to operator 228 indicative of the determined characteristics of the agricultural surface. Additionally, alerts can be communicated to remote computing system(s) 214 and/or remote user 218 via communication system 212.

FIG. 6 is a block diagram illustrating one example of sprayer performance system 312 in more detail. Sprayer performance system 312 includes spray application determination system 351, data capture logic 360, position logic 368, alert/notification system 370, processor(s)/controller(s) 284, communication system 212, action signal generator 376, model/map generator 378, and can include other items 380 as well.

By way of overview, sprayer performance system 312 determines characteristics relative to the agricultural sprayer system's performance. For example, sprayer performance system 312 can determine the coverage of substance sprayed by the spray nozzles 112. Additionally, sprayer performance system 312 can compare the determined coverage to, for example, a target/prescribed coverage. Further, performance system 312 can compare the difference between the performed spray application and the target/prescribed application to a spray quality threshold. Upon determining these various characteristics, action signals are generated and used to control the operation of agricultural sprayer system 102, or to generate recommendations/indications, as well as various other actions. The particular items in sprayer performance system 312 are now described.

Data capture logic 360 includes sensor accessing logic 362, data store accessing logic 364, and other logic 366. Sensor accessing logic 362 can be used to obtain sensor data (or values indicative of the sensed variables) provided from sensor(s) 128. This data can be used to detect characteristics relative to the application of substance to the agricultural surface. In one example, sensor accessing logic 362 receives an indication of how well the substance covered a corn silk. This is indicated by the sensor signals generated by one or more of sensors 128. The sensors can include, for example, an optical sensor that captures an image of the corn plant after the substance has been sprayed, a temperature sensor that generates an indication of spray coverage based on a temperature difference between the corn plant and the substance sprayed, or a temperature difference between the corn plant before the spraying application and after the spraying application, a moisture sensor that generates an indication of a difference between the moisture of a corn plant before the spraying application and after the spraying application. The indication can also be received as a set of electromagnetic radiation signals generated by various electromagnetic radiation sensors on agricultural sprayer system 102, towing vehicle 104, other vehicles 300 (e.g., UAV, ground vehicle, etc.), as well as other sources. These are examples only.

Additionally, data store accessing logic 364 can be used to obtain stored data from a data store (e.g., 278, 292, 306) and/or data from remote computing system(s) 214 in order to determine characteristics relative to the application of substance to the agricultural surface.

Upon receiving the captured data, spray application determination system 351 can determine characteristics of the application of substance to the agricultural surface. Spray application determination system can include spray application logic 352, spray quality metric logic 354, spray quality threshold logic and it can include other items 358.

Spray application logic 352 identifies the coverage of pesticide/insecticide (as well as other sprayed substances) on corn silks. Spray quality metric logic 354 generates various quality metrics indicative of the performance of the agricultural sprayer system. For example, logic 354 can generate quality metrics indicative of the coverage of pesticide/insecticide on corn silks and/or on pests, as identified by spray application logic 352. Additionally, spray quality metric logic 354 can provide the quality metrics to model/map generator 378. Generator 378 can correlate the quality metric values to geographic locations and generate a map indicative of a quality of the spraying operation across the field. Further, spray quality comparison logic 356 can compare the identified quality metrics indicative of performance to target/prescribed metrics indicative of target or prescribed performance of the agricultural sprayer system (e.g., target pesticide/insecticide coverage). A difference between the actual performance and the target/prescribed performance can be indicative of a quality of the operation. Additionally, spray quality threshold logic 358 can compare the difference to one or more threshold values. The threshold values can be automatically determined or manually selected (e.g., by a user or operator). The threshold values can represent, for example, an acceptable deviation from the desired quantity of pesticide/insecticide applied to the corn silks and/or pests, an acceptable deviation from the desired location of pesticide/insecticide applied to the corn silks and/or pests, among other things.

Based on the identified performance characteristics, spray application determination system 351 can generate various recommendations/indications for the operator 228 or remote user 216. Alert/notification system 370 can generate an alert or notification to operator 228 by surfacing a display or other indication to operator interface(s) 226. System 370 can also generate an alert or notification to remote user 216 by surfacing a display or other indication to remote computing system(s) 214. Additionally, spray application determination system 351 can generate various control signals using action signal generator 376 to control various subsystems (e.g., controllable subsystem(s) 222) of agricultural sprayer system 102, towing vehicle 104, and other vehicles 300.

For instance, upon determination that the quality of substance application by the agricultural sprayer system does not meet a quality threshold, spray application determination system 351 can generate control signals to adjust the operation of agricultural sprayer system 102 or to generate recommendations/indications. For example, spray application determination system 351 can generate a control signal to control the operation, spray characteristics, position, orientation (e.g., tilt), etc. of the spray nozzle(s) 112 such that they apply the substance to the corn silks more accurately. In another example, spray application determination system 351 can generate a control signal to control the operation of various components of spraying subsystem 254. For instance, system 351 can generate control signals to control pump(s) 270 and/or substance tank(s) 272 to control the type of substance (e.g., pesticide, insecticide, etc.) being sprayed by spray nozzle(s) 112 or the pressure at which the substance is sprayed by spray nozzle(s) 112.

Sprayer performance system 312 can also include position logic 368. Position logic 368 determines position information (e.g., height, tilt, distance, etc.) relative to various components of agricultural sprayer system 102. For instance, position logic 368 can determine the height of spray nozzle(s) 112 of agricultural sprayer system 102 from the field. Similarly, position logic 368 can determine the distance of spray nozzle(s) 112 from corn silks. Additionally, position logic 368 can determine the orientation of components spray nozzle(s) 112 of agricultural sprayer system 102. These determinations can be used by control system 208 to adjust the operation of the agricultural sprayer. For example, based on the deviation from the target/prescribed performance and the identified position of spray nozzle(s) 112, control system can generate control signals to adjust the position of spray nozzle(s) 112 such that they are configured to eliminate or reduce the deviation and apply the substance to the corn silk and/or pests, more accurately.

In one example, sprayer performance system 312 can include alert/notification system 370 to generate alerts to operator 228 indicative of the determined characteristics relative to the application quality. Additionally, alerts can be communicated to remote computing system(s) 214 and/or remote user 218 by communication system 212.

Figure 7:
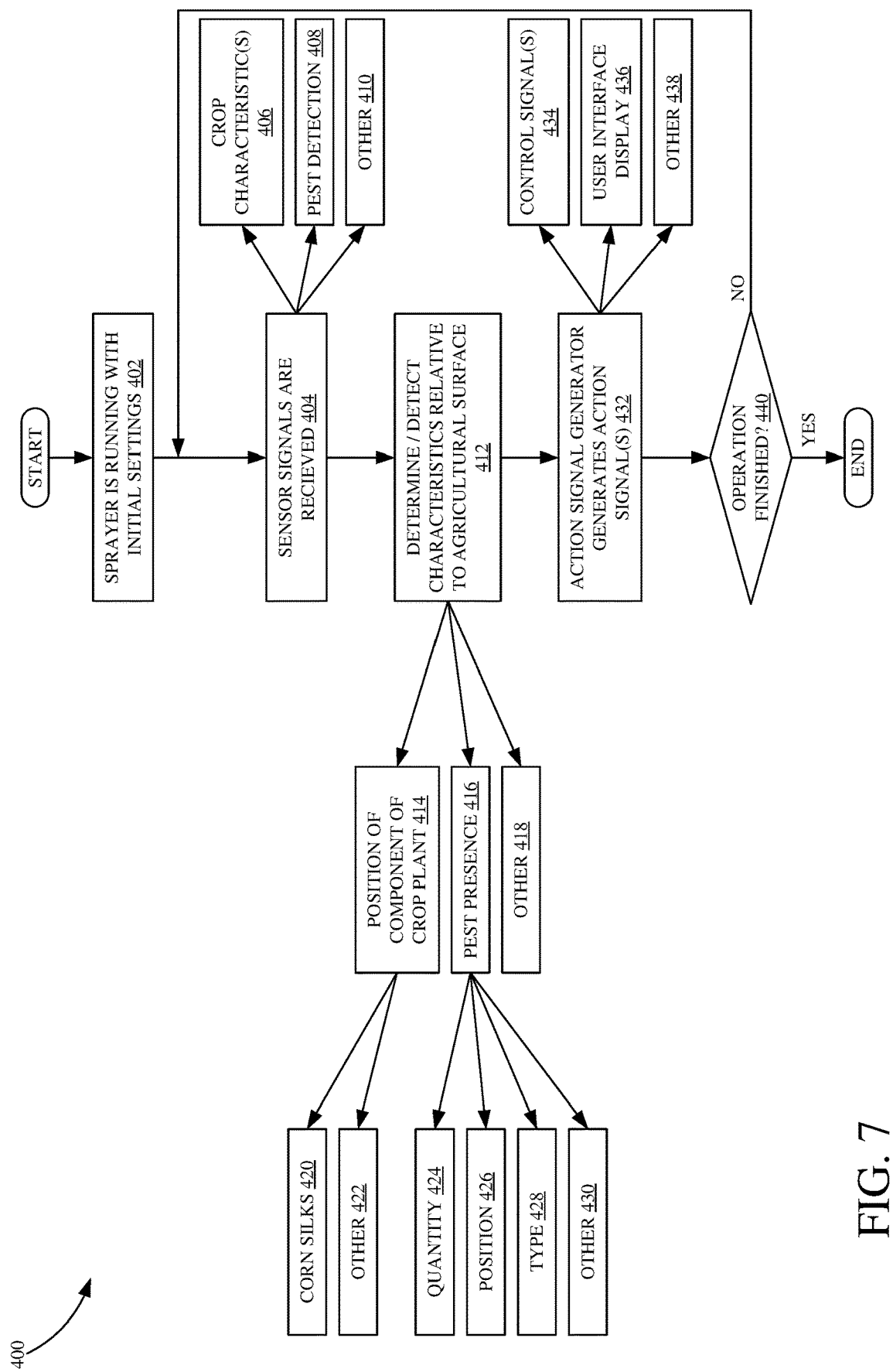
FIGS. 7-9 are flow diagrams showing example operations of the sprayer control system illustrated in FIG. 4.
Figure 8:
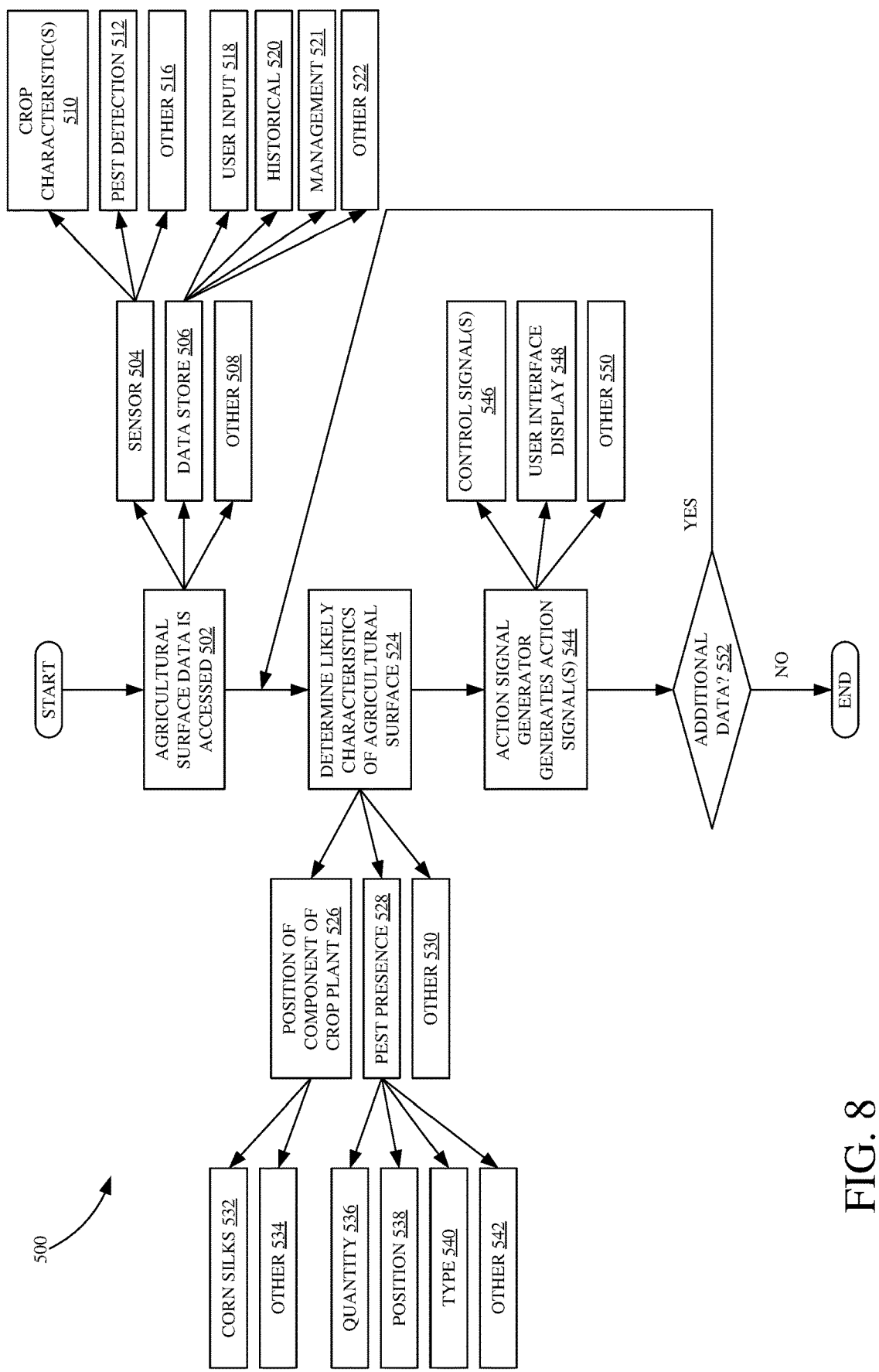
Figure 9:
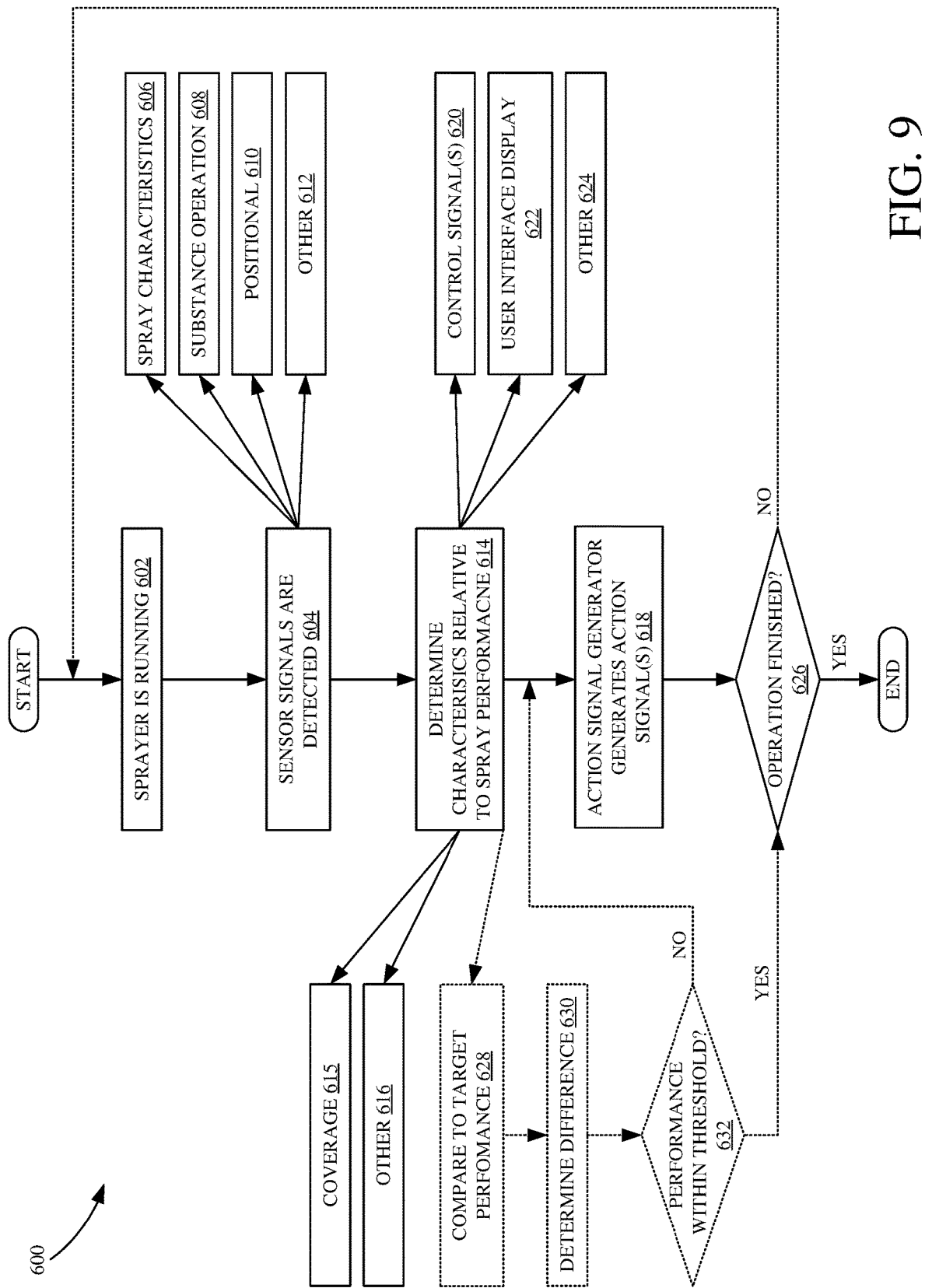

FIGS. 7-9 are flow diagrams showing example operations of a sprayer control system 224 illustrated in FIG. 4. The operation shown in FIG. 7 is one example of the operation of the system shown in FIG. 4 in determining characteristics relative to an agricultural surface. It is to be understood that the operation can be carried out at any time or at any point throughout an agricultural spraying operation, or even if an operation is not currently underway. Further, while the operation will be described in accordance with sprayer system 102, it is to be understood that other mobile machines with a sprayer control system 224 can be used as well.

It is initially assumed that sprayer system 102 is running, as indicated by block 402. For instance, operator 228 can provide initial machine settings that set the position, orientation, spray pattern, etc., of spray nozzle(s) 112, and that also turn on control pump(s) 270, set machine speed and direction, and various other machine settings. The operator can input these settings manually based upon his or her own prior experience and knowledge. The initial settings can also be made automatically by sprayer system 102 itself. In another example, prior operation settings (e.g., previous year settings) or estimated settings can be downloaded from a data store. Initial machine settings can be input in various other ways, including, but not by limitation, through a touch screen or other user input mechanism.

During operation of sprayer system 102, sensor signals are received from sensor(s) 128 as indicated by block 404. However, sensor signals can also be received from a variety of other sensors of other systems on mobile machines. Sensor signals can include crop characteristic(s) information, as indicated by block 406. Sensor signals can also include information/characteristics relative to the detection of pests as indicated by block 408. Sensor signals can include a variety of other sensor signals 410 as well, for example, but not limited to, position information relative to various components of the agricultural sprayer (e.g., position and orientation of boom arms, vertical spray arms, spray nozzles, etc.).

Upon receiving sensor signals, processing proceeds at block 412 where characteristics relative to the agricultural surface are identified or otherwise detected. In one example, sprayer operation system 310 can receive the sensor signals or indications of the sensor signals and can determine/detect a position of a component of a crop plant as indicated by block 414. This can include, for example, determining/detecting a position of corn silks on a corn plant as indicated by block 420. This can also include determining/detecting a position of other components on a variety of crop plants as indicated by block 414, such as a position of leaves on a corn plant (e.g., V12 & V13).

In another example, sprayer operation system 310 can receive the sensor signals or indications of the sensor signals and can determine/detect characteristics relative to the presence of pests on the agricultural surface as indicated by block 416. This can include, for example, determining/detecting a quantity of pests on the agricultural surface as indicated by block 424. This can also include, for example, determining/detecting a position of the pests on the crop plants, as indicated by block 426. This can further include, for example, determining/detecting a type of pest on the agricultural surface, as indicated by block 428. Other characteristics relative to the presence of pests on the agricultural surface can also be determined/detected as indicated by block 430.

In another example, sprayer operation system 310 can receive the sensor signals or indications of the sensor signals and can determine/detect a variety of other characteristics relative to the agricultural surface and/or sprayer as indicated by block 418. For instance, it can identify a position of components of the agricultural sprayer (e.g., position of boom arms, vertical spray arms, spray nozzles, etc.).

Upon determining/detecting characteristic(s) relative to the agricultural surface, processing proceeds to block 432 where action signal generator 346 generates an action signal. In one example, action signals can be used to control a subsystem of sprayer system 102, as indicated by block 434, to generate a user interface display (or other indication, e.g., an alert), as indicated by block 436, or in other ways as indicated by block 438.

Control signal(s) can be used to modify or otherwise control an operating characteristic of sprayer system 102. For example, a control signal can be generated and provided to controllable subsystem(s) 222 of sprayer system 102 which can include spraying subsystem 254, position subsystem 256, propulsion subsystem 258, steering subsystem 260, as well as other subsystems 262, such as a valve subsystem. By way of example, a control signal can be provided to spraying subsystem 254 to control operation of spray nozzle(s) 112 (e.g., control their spray characteristics, flow of substance through and to spray nozzle(s) 112, their position, orientation (tilt), etc.), control operation of pump(s) 270 and/or substance tank(s) 108 (e.g., control the pressure at which substance is provided to spray nozzle(s) 112, the type of substance being provided to spray nozzle(s) 112, etc.), as well as to control other components 276 of spraying subsystem 254 and/or other components of controllable subsystem(s) 222, as well as various other components of sprayer system 102.

A user interface display can be generated on operator interface(s) 226, remote computing system(s) 214, as well as other interfaces, and can indicate a variety of information. The interfaces can, for instance, include position(s) of component(s) of crop plant(s), information relative to the presence of pests (e.g., quantity, position, type of pests, etc.), recommendations as to the operation of the agricultural sprayer (e.g., output by a model generated by model generator 348), as well as a variety of other information. However, other user interface displays can be generated as well.

Processing then proceeds at block 440 where it is determined whether the spraying operation is finished. If, at block 440, it is determined that the spraying operation is not finished, processing proceeds at block 404 where sensor signals continue to be received.

FIG. 8 is one example of sprayer control system 224 determining likely characteristics relative to an agricultural surface. It is to be understood that the operation can be carried out at any time or at any point throughout an agricultural spraying operation, or even if an operation is not currently underway (e.g., during a pre-spraying operation). Further, while the operation will be described in accordance with sprayer system 102, it is to be understood that other mobile machines with a sprayer control system 224 can be used as well.

Processing begins at block 502 where data capture logic 324 of sprayer control system 224 obtains data relating to an agricultural surface to be sprayed by agricultural sprayer system 102. In one example, data capture logic 324 obtains data generated by sensor(s) 128, as indicated by block 504, data from a data store (e.g., from one or more of data stores 278, 292, 306), as indicated by block 506, and/or from other sources, as indicated by block 508. The data obtained from sensor(s) 128 at block 504 can include sensor data relating to crop characteristic(s), as indicated by block 510, data relating to pest detection, as indicated by block 512, as well as variety of other sensor data, as indicated by block 516. By way of example, data capture logic 324 can obtain sensor data relating to a likely position of silks on a corn plant. The data obtained from a data store at block 506 can include data input by a user/operator, as indicated by block 518, historical data as indicated by block 520, management data as indicated by block 521, as well as other data 522. By way of example, data capture logic 324 can obtain data input by a user relative to the growing conditions (e.g. weather data, etc.) and/or management data (e.g., crop cultivar or hybrid, etc.), historical data relative to the field and/or previous operations on the field, as well as a variety of other data.

Once the data is accessed at block 502, processing proceeds at block 524 where likely characteristics of the agricultural surface to be sprayed are identified, based on the data. In one example, agricultural surface characteristics prediction system 332 receives sensor data and determines likely positions of components of crop plants on the agricultural surface, as indicated by block 526, likely characteristics relative to pest presence, as indicated by block 528, as well as other likely characteristics, as indicated by block 530. Determining the likely positions of components of crop plants at 526 can include, for example, determining the likely positions of corn silks, as indicated by block 532, as well as the likely positions of other components of various crop plants, as indicated by block 534. Determining the likely characteristics relative to pest presence on the agricultural surface at block 528 can include, for example, determining the likely quantity of pests likely to be present, as indicated by block 536, determining the likely position of pests on the agricultural surface (e.g., on the corn silks, in the crop canopy, etc.), as indicated by block 538, determining the type of pest likely to be present, as indicated by block 540, as well as various other characteristics relative to pest presence, as indicated by block 542.

Once a determination as to the likely characteristics of the agricultural surface has been made at block 524, processing proceeds at block 544 where action signal generator 346 generates an action signal. In one example, action signals can be used to control a subsystem of sprayer system 102, as indicated by block 546, to generate a user interface display (or other indication, e.g., an alert), as indicated by block 548, or in other ways as indicated by block 550. Control signal(s) can be used to modify or otherwise control an operating characteristic of sprayer system 102. For example, a control signal can be generated and provided to controllable subsystem(s) 222 of sprayer system 102 which can include spraying subsystem 254, position subsystem 256, propulsion subsystem 258, steering subsystem 260, as well as other subsystems 262.

By way of example, a control signal can be provided to spraying subsystem 254 to control, for instance, operation and/or position of spray nozzle(s) 112, control operation of pump(s) 270 and/or substance tank(s) 108 (e.g., control the pressure and/or flowrate at which substance is provided to spray nozzle(s) 112, the type of substance being provided to spray nozzle(s) 112, etc.). Control signals can also be generated to control other components 276 of spraying subsystem 254 and/or other components of controllable subsystem(s) 222, as well as various other components of sprayer system 102, for instance a controllable valve subsystem.

Processing then proceeds at block 552 where it is determined whether additional data has been received/accessed. If, at block 552, it is determined that additional data has been received/accessed, processing proceeds at block 524 where agricultural surface characteristics prediction system 332 continues to identify likely characteristics of the agricultural surface to be sprayed.

FIG. 9 is one example of identifying characteristics relative to a spray performance of sprayer system 102. It is to be understood that the operation can be carried out at any time or at any point throughout a spraying operation, or even if an operation is not currently underway (e.g., in a post-spraying operation). Further, while the operation will be described in accordance with sprayer system 102, it is to be understood that other mobile machines with a sprayer control system 224 can be used as well.

It is initially assumed that sprayer system 102 is running, as indicated by block 602. This can be done in a variety of ways. For instance, operator 228 can provide initial machine settings based on a worksite operation. The operator can input these setting based upon his or her own prior experience and knowledge. The settings can be made manually, such as through mechanical or other input mechanisms, or they can be made automatically by sprayer system 102 itself, or they can be input a different way, such as through a touch screen or other user input mechanism.

During operation of sprayer system 102, sensor signals are received from sensor(s) 128 as indicated by block 604. However, sensor signals can also be received from a variety of other sensors of other systems on mobile machines. Sensor signals can include signals indicative of spray characteristics (e.g., from spray pattern sensors 238), as indicated by block 606, signals indicative of substance operation (e.g., from substance operation sensors 236), as indicated by block 608, signals indicative of positions of various components of sprayer system 102 (e.g., from position sensors 234), as indicated by block 610, as well as various other signals indicative of various other sensed variables, as indicated by block 612.

Based on the sensor signals, spray performance system 312 identifies characteristics relative to spray performance. In one example, spray performance system 312 can determine coverage of spray, as indicated by block 615. This can include determining whether the substance sprayed covered the desired target. For instance, system 312 can determine whether the pesticide/insecticide covered corn silks on a corn plant, whether the pesticide/insecticide covered the position of pests on the agricultural surface, etc. Determining the coverage can include determining a desired position of the spray application (e.g., did the spray hit the desired target location), and/or determining a desired quantity of the spray application (e.g., is there enough spray on the desired target location). Spray performance system can determine various other characteristics relative to a spray performance, as indicated by block 616. This can include, for instance, other characteristics relative to spray pattern, such as spray angle, spray impact, droplet size, etc. This can also include determining whether the pressure at which the spray is provided is adequate, whether the type of substance being provided is correct, as well as other determinations.

Based on characteristics of spray performance, action signal generator 376 generates an action signal. This is indicated by block 618. In one example, an action signal can be used to control a subsystem of sprayer system 102, as indicated by block 620, to generate a user interface display (or other indication, such as an alert), as indicated by block 622, or in other ways as indicated by block 624.

Control signals can also be used to modify or otherwise control an operating characteristic of sprayer system 102. For example, a control signal can be generated and provided to spraying subsystem 254 to control operation and/or position of spray nozzle(s) 112, control operation of pump(s) 270 and/or substance tank(s) 108, as well as other components 276 of spraying subsystem 254, such as a valve subsystem. Control signals can be provided to other components of controllable subsystem(s) 222, as well as various other components of sprayer system 102.

Additionally, control signals can be generated to control one or more other vehicles 300. For example, control signals can be provided to control vehicle 300 to follow behind sprayer system 102 and supplement the spraying application to compensate for any shortcomings in the spray performance (e.g., apply additional spray to crop plants, pests, etc.).

Also, in one example, upon determining characteristics relative to spray performance, processing can proceed to block 628 where the determined performance is compared to a target/prescribed performance. The target/prescribed performance can be indicative of a desired performance of sprayer system 102 as set by a user/operator, as set automatically by sprayer system 102 (e.g., by control system 208), or that can be set in other ways.

Processing then proceeds at block 630 where a difference between the target/prescribed performance and the actual performance is determined. This can include identifying the difference for various performance metrics. This can also include model generator 378 correlating the metric values to geographic locations to generate a variety of performance models (e.g., maps). As one example, the map may be a target/prescribed performance map, an actual performance map, a difference map, etc.

Upon determining the difference, processing proceeds at block 632 where the difference in performance is compared to a performance/quality threshold. The threshold can comprise a variety of threshold values. For instance, the threshold can be a spray coverage threshold indicative of an acceptable level of coverage. If at block 632 it is determined that the spray coverage is within the threshold range (e.g., acceptable levels) processing continues at block 626. If at block 632 it is determined that the spray coverage is not within the threshold range, processing continues at block 618 where action signals are generated by action signal generator 376.

At block 626 it is determined if the operation is finished. If it is determined that the operation is not finished, processing continues at block 602 where the sprayer continues to run.

The present discussion has mentioned processors or servers. In one embodiment, the processors or servers include computer processors with associated memory and timing circuitry, not separately shown. They are functional parts of the systems or devices to which they belong and are activated by and facilitate the functionality of the other components or items in those systems.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 10:
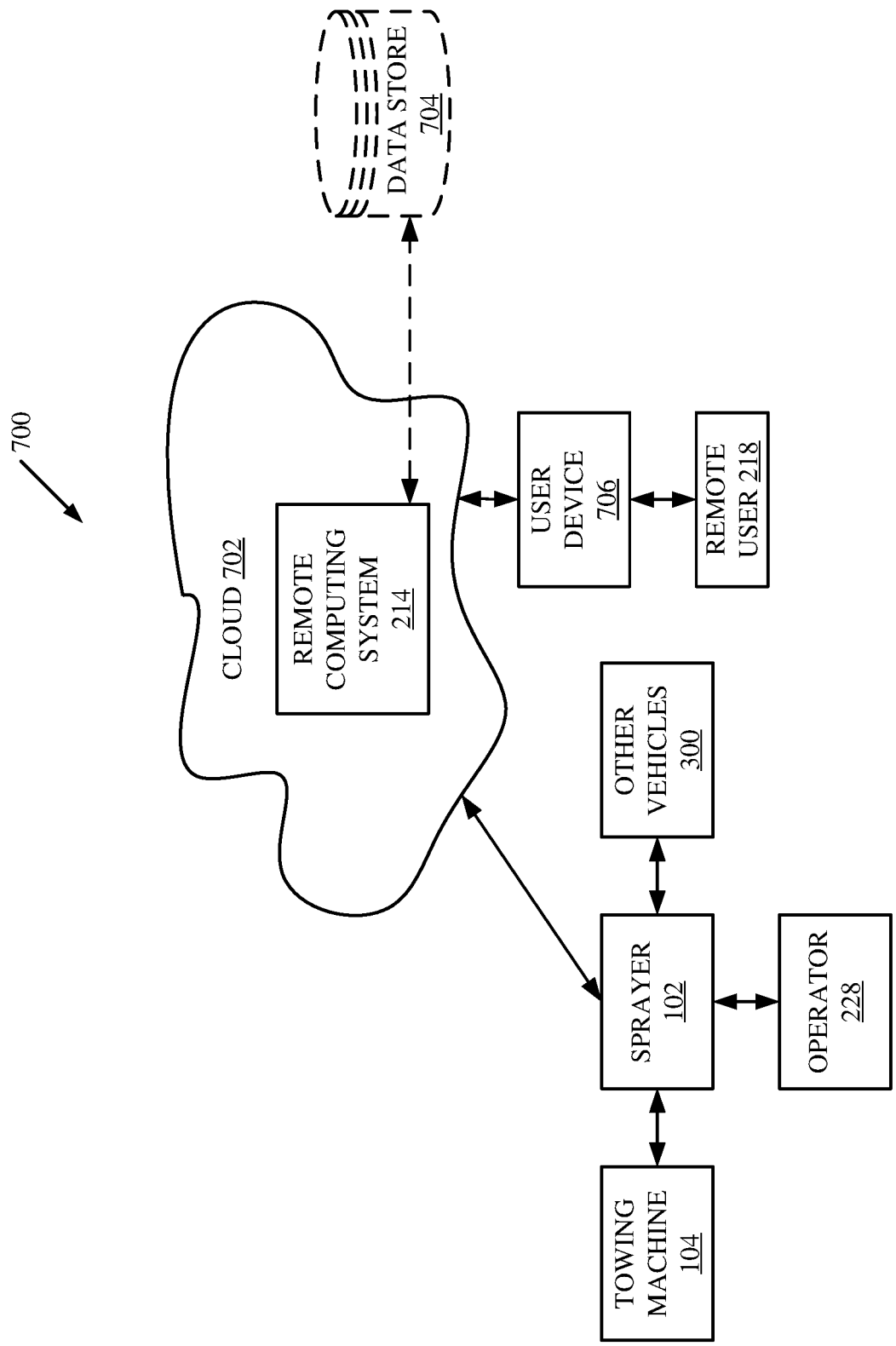
FIG. 10 is a block diagram showing the architecture illustrated in FIG. 3 deployed in a remote server architecture.

FIG. 10 is a block diagram of sprayer system 102, shown in FIG. 3, except that it communicates with elements in a remote server architecture 700. In an example embodiment, remote server architecture 700 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 3 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the embodiment shown in FIG. 10, some items are similar to those shown in FIG. 3 and they are similarly numbered. FIG. 10 specifically shows that remote computing system 214 can be located at a remote server location 702. Therefore, sprayer system 102, towing vehicle 104, other vehicles 300 (e.g., UAV, mobile machines, ground vehicles, etc.), and operator 228 accesses those systems through remote server location 702.

FIG. 10 also depicts another embodiment of a remote server architecture. FIG. 10 shows that it is also contemplated that some elements of FIG. 1 are disposed at remote server location 702 while others are not. By way of example, data store 704, which can comprise a third-party system, can be disposed at a location separate from location 702 and accessed through the remote server at location 702. Regardless of where they are located, they can be accessed directly by sprayer system 102, towing vehicle 104, other vehicles 300 and/or operator 228, as well as by remote user 218 (via user device 706) through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent, another mobile machine (such as a fuel truck) can have an automated information collection system. As the sprayer comes close to the fuel truck for fueling, the system automatically collects the information from the sprayer using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the sprayer until the sprayer enters a covered location. The sprayer, itself, can then send the information to the main network.

It will also be noted that the elements of FIG. 3, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 11:
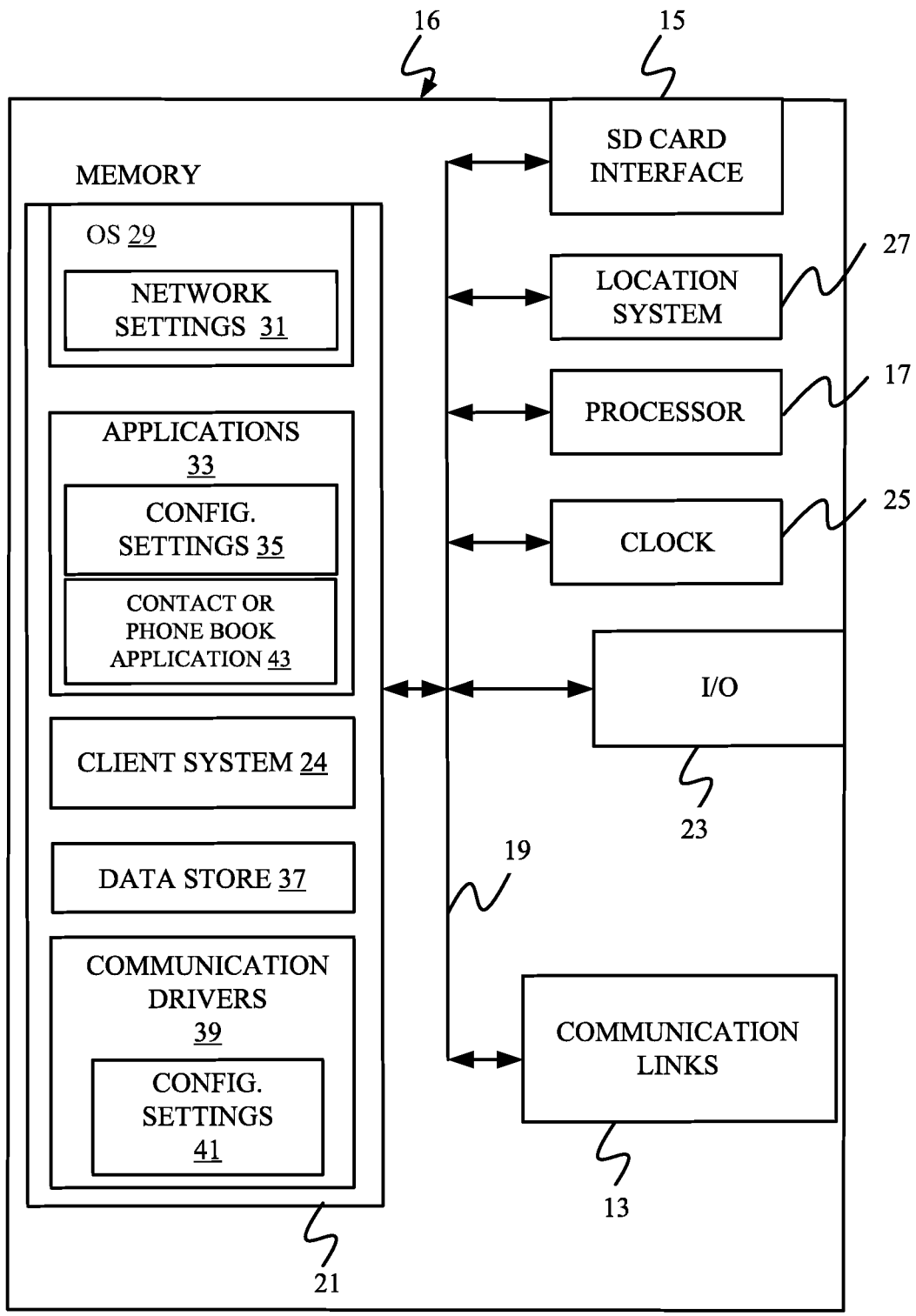
FIGS. 11-13 show examples of mobile devices that can be used in the architectures shown in the previous FIGS.
Figure 12:
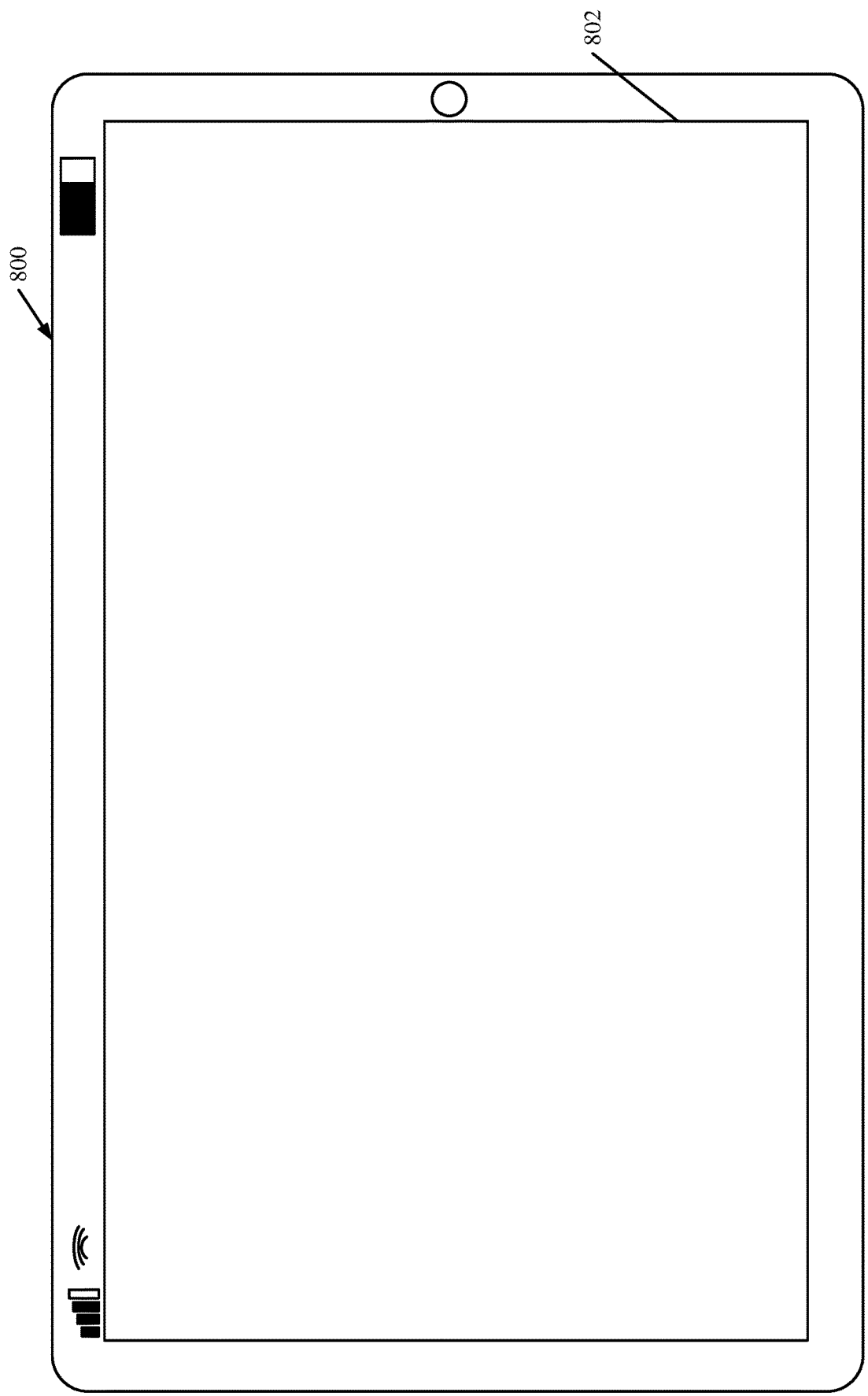
Figure 13:
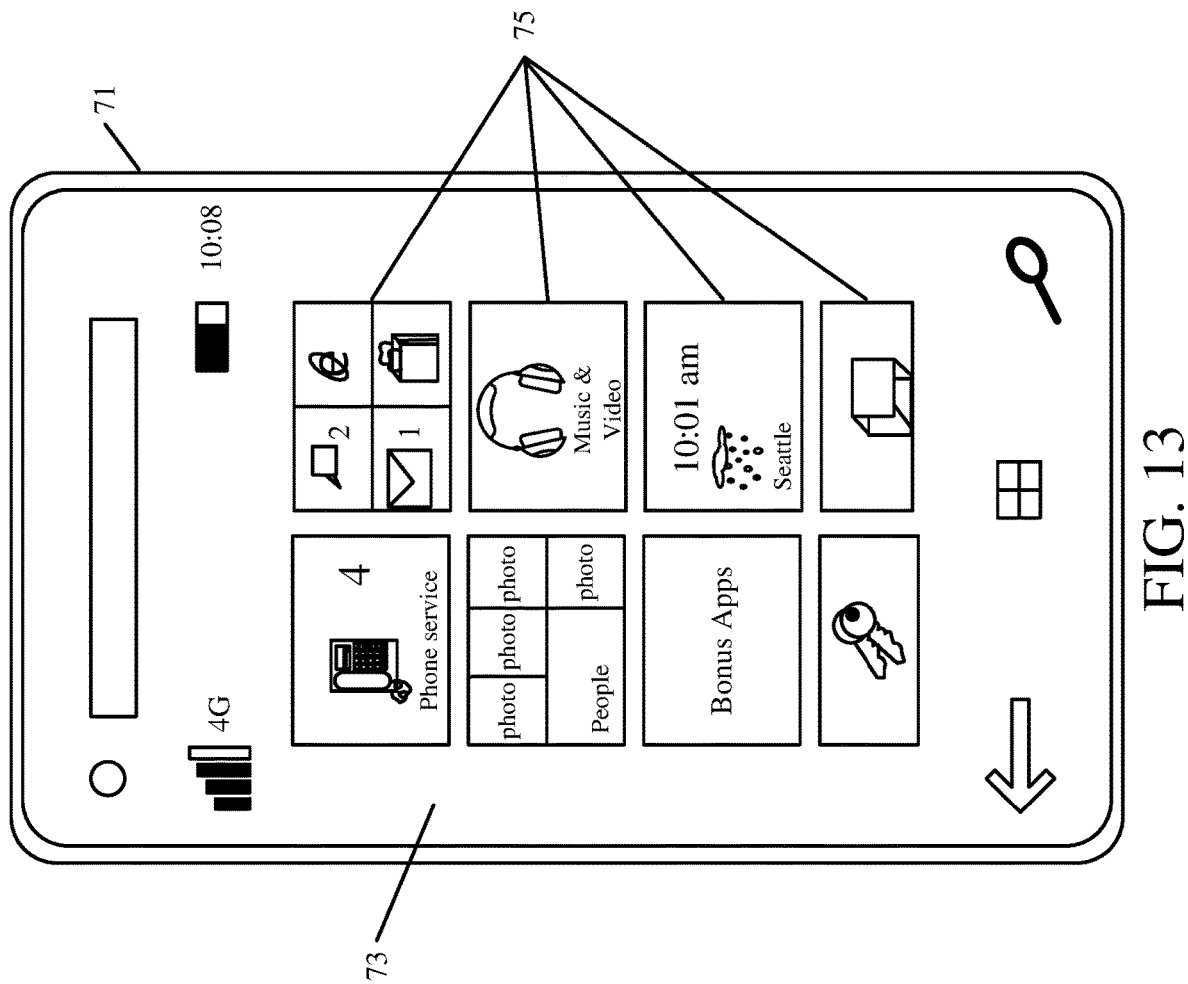

FIG. 11 is a simplified block diagram of one illustrative embodiment of a handheld or mobile computing device that can be used as a user's or client's handheld device 16, in which the present system (or parts of it) can be deployed. For instance, a mobile device can be deployed in the operator compartment of sprayer system 102 for use in generating, processing, or displaying the stool width and position data. FIGS. 12-13 are examples of handheld or mobile devices.

FIG. 11 provides a general block diagram of the components of a client device 16 that can run some components shown in FIG. 3, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

Under other embodiments, applications can be received on a removable Secure Digital (SD) card that is connected to an interface 15. Interface 15 and communication links 13 communicate with a processor 17 (which can also embody processor 284 from FIG. 3) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 12 shows one embodiment in which device 16 is a tablet computer 800. In FIG. 12, computer 800 is shown with user interface display screen 802. Screen 802 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 800 can also illustratively receive voice inputs as well.

FIG. 13 is similar to FIG. 12 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 14:
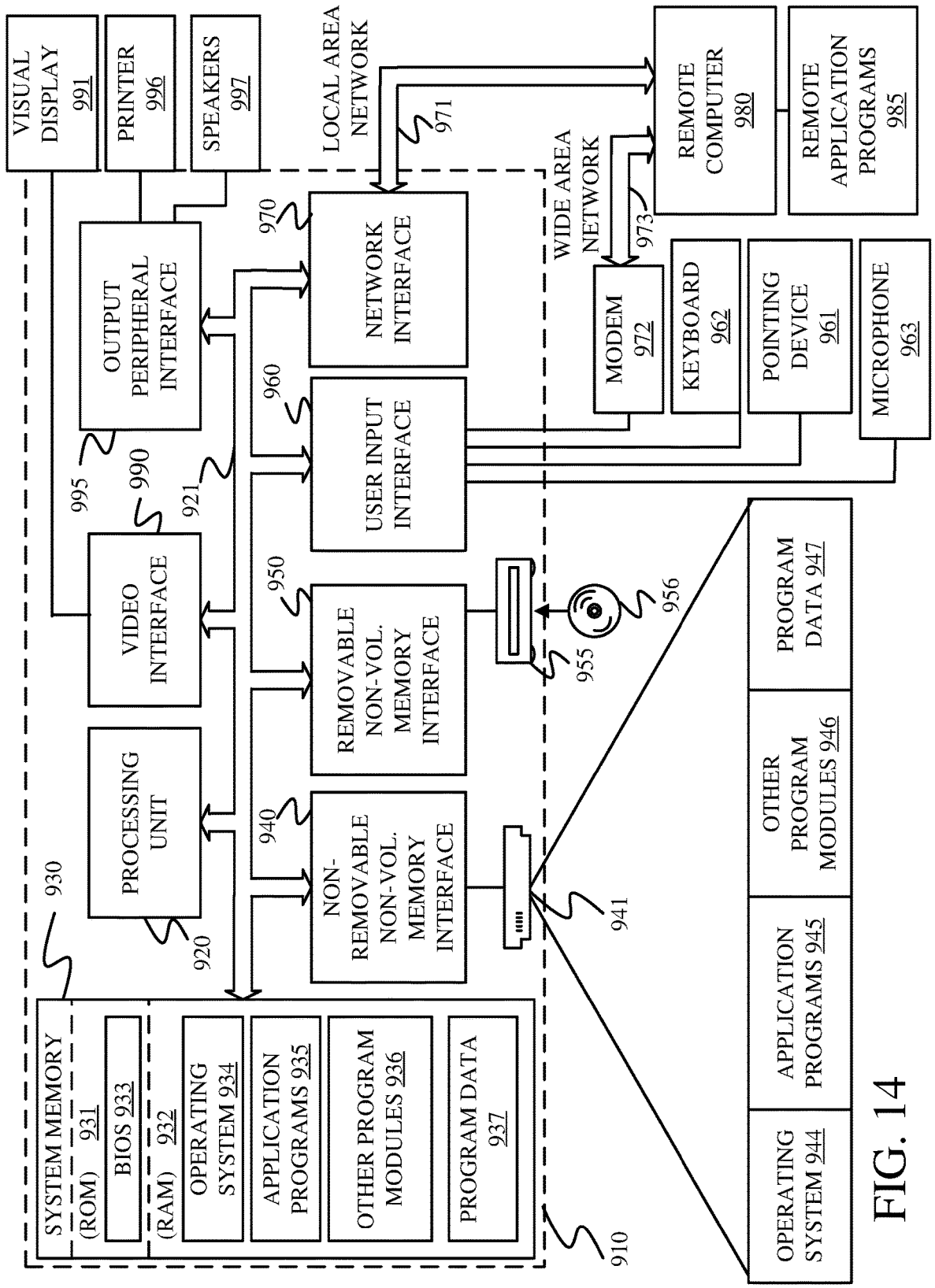
FIG. 14 is a block diagram showing one example of a computing environment that can be used in the architecture illustrated in previous FIGS.

FIG. 14 is one embodiment of a computing environment in which elements of FIG. 3, or parts of it, (for example) can be deployed. With reference to FIG. 14, an exemplary system for implementing some embodiments includes a general-purpose computing device in the form of a computer 910. Components of computer 910 may include, but are not limited to, a processing unit 920 (which can comprise processor 284), a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. Memory and programs described with respect to FIG. 3 can be deployed in corresponding portions of FIG. 14.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 14 illustrates operating system 934, application programs 935, other program modules 936, and program data 937.

The computer 910 may also include other removable/non-removable volatile/nonvolatile computer storage media. By way of example only, FIG. 14 illustrates a hard disk drive 941 that reads from or writes to non-removable, nonvolatile magnetic media, an optical disk drive 955, and nonvolatile optical disk 956. The hard disk drive 941 is typically connected to the system bus 921 through a non-removable memory interface such as interface 940, and optical disk drive 955 are typically connected to the system bus 921 by a removable memory interface, such as interface 950.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 14, provide storage of computer readable instructions, data structures, program modules and other data for the computer 910. In FIG. 14, for example, hard disk drive 941 is illustrated as storing operating system 944, application programs 945, other program modules 946, and program data 947. Note that these components can either be the same as or different from operating system 934, application programs 935, other program modules 936, and program data 937.

A user may enter commands and information into the computer 910 through input devices such as a keyboard 962, a microphone 963, and a pointing device 961, such as a mouse, trackball or touch pad. Other input devices (not shown) may include a joystick, game pad, satellite dish, scanner, or the like. These and other input devices are often connected to the processing unit 920 through a user input interface 960 that is coupled to the system bus but may be connected by other interface and bus structures. A visual display 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 is operated in a networked environment using logical connections (such as a local area network—LAN, or wide area network WAN) to one or more remote computers, such as a remote computer 980.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. In a networked environment, program modules may be stored in a remote memory storage device. FIG. 14 illustrates, for example, that remote application programs 985 can reside on remote computer 980.

It should also be noted that the different embodiments described herein can be combined in different ways. That is, parts of one or more embodiments can be combined with parts of one or more other embodiments. All of this is contemplated herein.

Example 1 is an agricultural sprayer, comprising:
a spraying system that sprays a substance on an agricultural surface;
a crop characteristic sensor that senses a crop characteristic of a crop on the agricultural surface and generates a crop characteristic signal indicative of the crop characteristic;
a spray control system that identifies a position of a component of a crop plant based on the crop characteristic sensor signal; and
an action signal generator that generates an action signal based on the identified position of the component of the crop plant.

Example 2 is the agricultural sprayer of any or all previous examples, wherein the spray control system identifies a position of corn silks on a corn plant and wherein the spraying system comprises:
a number of actuatable spray nozzles.

Example 3 is the agricultural sprayer of any or all previous examples, wherein the action signal generator generates a first control signal that controls a position of at least one of the actuatable spray nozzles to spray the substance onto the identified position of the corn silk of the corn plant.

Example 4 is the agricultural sprayer of any or all previous examples, wherein the sprayer control system further comprises:

a sprayer performance system configured to receive, from a spray pattern sensor, a spray pattern sensor signal indicative of a coverage of the substance sprayed onto the identified position of the corn silks and generate a performance metric based on the coverage of the substance sprayed onto the identified position of the corn silks.

Example 5 is the agricultural sprayer of any or all previous examples, wherein the sprayer performance system is further configured to:

generate the performance metric by comparing the coverage of the substance to a spray performance threshold.

Example 6 is the agricultural sprayer of any or all previous examples, wherein the action signal generator generates a second control signal that adjusts the position of the at least one actuatable spray nozzle based on the coverage.

Example 7 is the agricultural sprayer of any or all previous examples, wherein the action signal generator generates a third control signal that controls a UAV to apply additional substance to the identified position of the corn silks based on the coverage.

Example 8 is the agricultural sprayer of any or all previous examples wherein the sprayer control system further comprises:

a pest detection sensor that generates a pest detection sensor signal indicative of a characteristic relative to a pest on the agricultural surface; and pest detection logic configured to identify a position of the pest on the crop plant based on the pest detection sensor signal.

Example 9 is the agricultural sprayer of any or all previous examples wherein the action signal generator generates a second control signal to control the at least one actuatable spray nozzle to spray substance identified position of the pest on the crop plant.

Example 10 is the agricultural sprayer of any or all previous examples wherein the pest detection logic is further configured to identify a type of pest on the crop plant based on the pest detection sensor signal.

Example 11 is the agricultural sprayer of any or all previous examples wherein the action signal generator generates a third control signal that controls a type of substance to be sprayed onto the crop plant by the at least one actuatable spray nozzle based on the identified type of pest.

Example 12 is a mobile agricultural sprayer comprising:

a spraying subsystem comprising:

an at least one actuatable spray nozzle that sprays a substance onto a corn plant on an agricultural surface;

a crop characteristic sensor that senses a position of a corn silk on the corn plant on the agricultural surface and generates a sensor signal indicative of the position of the corn silk on the corn plant; and a spray control system that generates a first control signal to control the at least one actuatable spray nozzle to direct the spraying of the substance toward the position of the corn silk on the corn plant indicated by the sensor signal.

Example 13 is the mobile agricultural sprayer of any or all previous examples and further comprising:

a pest detection sensor that senses a position of a pest on the corn plant and generates a sensor signal indicative of the position of the pest on the corn plant; and pest detection logic that determines a position of the pest on the corn plant based on the pest detection sensor signal.

Example 14 is the mobile agricultural sprayer of any or all previous examples wherein the spray control system generates a second control signal to control the at least one actuatable spray nozzle based on the identified position of the pest on the corn plant.

Example 15 is the mobile agricultural sprayer of any or all previous examples wherein the sprayer control system further comprises:

a sprayer performance system configured to receive a sensor signal, from a spray pattern sensor, indicative of a coverage of the substance sprayed onto the corn plant, and identify a coverage metric indicative of the coverage of the substance sprayed onto the corn plant based on the spray pattern sensor signal.

Example 16 is the mobile agricultural sprayer of any or all previous examples and further comprising:

a user interface mechanism wherein the action signal generator generates a third control signal to surface the coverage metric on the user interface mechanism.

Example 17 is the mobile agricultural sprayer of any or all previous examples wherein the action signal generator generates a vehicle control signal to control a vehicle to apply additional substance to the identified position of the corn silk on the corn plant based on the coverage metric.

Example 18 is a method of controlling an agricultural machine, the method comprising:

receiving a first sensor signal indicative of a characteristic of an agricultural surface;

determining a position of a corn silk on a corn plant based on the first sensor signal; and automatically controlling an actuatable spray nozzle to spray a substance in a direction based on the position of the corn silk on the corn plant relative to a position of the actuatable spray nozzle.

Example 19 is the method of any or all previous examples, and further comprising:

receiving a pest sensor signal indicative of a pest on the corn plant;

identifying a position of the pest on the corn plant based on the pest sensor signal; and controlling the spraying system to spray the substance onto the identified position of the pest on the corn plant.

Example 20 is the method of any or all previous examples, and further comprising:

receiving a performance sensor signal indicative of a performance of the spraying system;

generating a sprayer performance metric based on the performance sensor signal; and generating a control signal, based on the performance metric, to surface the performance metric on an operator interface mechanism.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural sprayer, comprising:
a set of ground engaging traction elements that support the agricultural sprayer over an agricultural surface;
a boom;
a plurality of actuatable spray nozzles, coupled to the boom, that apply a substance;
one or more processors;
memory; and
computer executable instructions, stored in the memory, that, when executed by the one or more processors, configure the one or more processors to:
obtain management data indicative of a hybrid or cultivar of a crop plant of the agricultural surface;
obtain growing condition data indicative of growing conditions at the agricultural surface during growth of the crop plant;
predict a position of a component of a crop plant of the agricultural surface based on the management data and the growing condition data; and
generate an action signal based on the predicted position of the component of the crop plant of the agricultural surface.

2. The agricultural sprayer of claim 1, wherein the computer executable instructions, when executed by the one or more processors, further configure the one or more processors to predict a pest characteristic of the agricultural surface based on the management data.

3. The agricultural sprayer of claim 1, wherein the crop plant comprises a corn plant and wherein the component of the crop plant comprises a corn silk of the corn plant.

4. The agricultural sprayer of claim 2, wherein the pest characteristic comprises one of:
pest presence;
pest position;
pest quantity; or
pest type.

5. The agricultural sprayer of claim 1, wherein the growing condition data includes weather data indicative of weather conditions at the agricultural surface during growth of the crop plant and to predict the position of the component of the crop plant of the agricultural surface based on the weather data.

6. The agricultural sprayer of claim 1, wherein the action signal controls one of the boom or an actuatable spray nozzle of the plurality of actuatable spray nozzles.

7. The agricultural sprayer of claim 2 and further comprising:
a pest detection sensor that detects the pest characteristic during operation of the agricultural sprayer at the agricultural surface and generates a pest detection sensor signal indicative of the detected pest characteristic; and
wherein the action signal comprises a first action signal and wherein the computer executable instructions, when executed by the one or more processors, further configure the one or more processors to generate a second action signal based on the detected pest characteristic.

8. The agricultural sprayer of claim 1 and further comprising:
a crop characteristic sensor that detects the position of the component of the crop plant during operation of the agricultural sprayer at the agricultural surface and generates a sensor signal indicative of the detected position of the component of the crop plant; and
wherein the action signal comprises a first action signal and wherein the computer executable instructions, when executed by the one or more processors, further configure the one or more processors to generate a second action signal based on the detected position of the component of the crop plant.

9. The agricultural sprayer of claim 1, wherein the action signal controls a heading of the agricultural sprayer.

10. The agricultural sprayer of claim 1, wherein the action signal controls a speed of the agricultural sprayer.

11. A mobile agricultural sprayer comprising:
a set of ground engaging traction elements that support the mobile agricultural sprayer over an agricultural surface;
a boom;
a plurality of actuatable spray nozzles, coupled to the boom, that apply a substance;
one or more processors;
memory storing computer executable instructions that, when executed by the one or more processors, configure the one or more processors to:
obtain management data indicative of a hybrid or cultivar of a crop plant of the agricultural surface;
predict a position of a component of a crop plant at the agricultural surface based on the management data;
predict a pest characteristic at the agricultural surface based on the management data; and
generate an action signal to control the mobile agricultural sprayer based on at least one of the predicted position of the component of the crop plant and the predicted pest characteristic.

12. The mobile agricultural sprayer of claim 11 and further comprising:
a pest detection sensor that senses a position of a pest on the crop plant and generates a sensor signal indicative of the position of the pest on the crop plant; and
wherein the computer executable instructions, when executed by the one or more processors, further configure the one or more processors to determine a position of the pest on the crop plant based on the pest detection sensor signal.

13. The mobile agricultural sprayer of claim 12, wherein the computer executable instructions, when executed by the one or more processors, further configure the one or more processors to generate a second action signal to control at least one actuatable spray nozzle of the plurality of actuatable spray nozzles based on the determined position of the pest on the crop plant.

14. The mobile agricultural sprayer of claim 11, wherein the computer executable instructions, when executed by the one or more processors, further configure the one or more processors to:
receive, from a spray pattern sensor, a sensor signal indicative of a coverage of substance sprayed onto the crop plant;
identify a coverage metric indicative of the coverage of the substance sprayed on the crop plant based on the sensor signal from the spray pattern sensor; and
generate a vehicle control signal to control a vehicle to apply additional substance to the crop plant based on the coverage metric.

15. A computer implemented method of controlling a mobile agricultural sprayer having a set of ground engaging traction elements that support the mobile agricultural sprayer over an agricultural surface, a boom, and a plurality of actuatable spray nozzles, coupled to the boom, that apply a substance, the computer implemented method comprising:

obtaining management data indicative of a hybrid or cultivar of a crop plant of the agricultural surface;

obtaining growing condition data indicative of growing conditions at the agricultural surface during growth of the crop plant;

predicting a position of a component of the crop plant based on the management data and the growing condition data; and automatically controlling at least one actuatable spray nozzle of the plurality of actuatable spray nozzles based on the predicted position of the component of the crop plant.

16. The computer implemented method of claim 15 and further comprising:

predicting a pest characteristic of the agricultural surface based on the management data; and automatically controlling the mobile agricultural sprayer based on the predicted pest characteristic.

17. The computer implemented method of claim 16 and further comprising:

receiving a performance sensor signal indicative of a performance of the spraying system;

generating a sprayer performance metric based on the performance sensor signal; and generating a control signal, based on the performance metric, to surface the performance metric on an operator interface mechanism.

18. The agricultural sprayer of claim 1 and further comprising:

a plurality of spray arms spaced apart along the boom and having a longitudinal axis transverse to the longitudinal axis of the boom, wherein each spray arm, of the plurality of spray arms, includes at least one of the plurality of actuatable spray nozzles;

wherein the boom is configured to travel over a canopy of crop and the plurality of spray arms are configured to travel between rows of crop;

wherein each spray arm includes a respective plurality of actuatable spray nozzles, of the plurality of actuatable spray nozzles, spaced apart along its longitudinal axis; and wherein the action signal controls at least one actuatable spray nozzle of the respective plurality of actuatable spray nozzles spaced apart along the longitudinal axis of a corresponding spray arm to spray substance onto the predicted position of the component of the crop plant.

19. The agricultural sprayer of claim 18 and further comprising:

a plurality of crop characteristic sensors spaced apart that each sense a respective crop characteristic of a respective crop plant in a respective row and generate a respective crop characteristic signal indicative of the respective crop characteristic;

wherein the computer executable instructions, when executed by the one or more processors, further configure the one or more processors to:

identify a position of a respective component of each respective crop plant based on the respective crop characteristic signal; and generate a respective action signal to control the at least one actuatable spray nozzle of each vertical spray arm to spray substance on the respective component of the respective crop plant, based on the respective identified position of the respective component of the respective crop plant.

* * * * *